(12) United States Patent
Kitao et al.

(10) Patent No.: US 6,296,163 B1
(45) Date of Patent: *Oct. 2, 2001

(54) CARRIER FOR STRADDLE TYPE FOUR WHEELED ALL-TERRAIN VEHICLE AND SUPPORT STRUCTURE THEREFOR

(75) Inventors: Jiro Kitao, Kobe; Takeshi Usui, Takasago; Hideyoshi Kosuge, Kakogawa; Kazuhiro Maeda; Fumio Mizuta, both of Akashi; Toru Minami, Kakogawa, all of (JP)

(73) Assignee: Kawasaki Jukogyo Kabushiki Kaisha, Hyogo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,874

(22) Filed: Jun. 28, 1999

(30) Foreign Application Priority Data

Jul. 9, 1998 (JP) .................................................. 10-194574
Aug. 7, 1998 (JP) .................................................. 10-224615

(51) Int. Cl.⁷ ................................. B60R 9/00; B60R 9/06
(52) U.S. Cl. .......................... 224/401; 224/452; 224/455; 224/524; 224/534; 410/101; 410/111
(58) Field of Search ............................ 224/401, 451–455, 224/499, 524, 534; 410/101–106, 107, 109, 110, 111, 112, 116; 296/39.2

(56) References Cited

U.S. PATENT DOCUMENTS

| 283,320 | * | 8/1883 | Basinger . | |
| D. 378,080 | | 2/1997 | Walters et al. . | |
| 1,904,114 | * | 4/1933 | Ambrosius | 224/524 X |
| 2,756,693 | * | 7/1956 | Frost . | |
| 4,300,706 | * | 11/1981 | Hendrick et al. | 224/401 X |

(List continued on next page.)

FOREIGN PATENT DOCUMENTS

| 3935267 A | * | 4/1991 | (DE) | 410/107 |
| 4103250 A1 | * | 8/1992 | (DE) | 410/112 |
| 943133 | * | 2/1949 | (FR) | 224/32 A |
| 1372765 | * | 4/1964 | (FR) | 224/32 A |
| SHO 33-18130 | | 11/1958 | (JP) . | |
| SHO 48-24189 | | 7/1973 | (JP) . | |
| SHO 58-139290 | | 9/1983 | (JP) . | |
| 61-37552 | | 2/1986 | (JP) . | |
| 61-85285 | | 4/1986 | (JP) . | |
| 61-222832 | | 10/1986 | (JP) . | |
| SHO 62-90285 | | 6/1987 | (JP) . | |
| HEI 1-23901 | | 7/1989 | (JP) . | |
| 1-215684 | | 8/1989 | (JP) . | |

(List continued on next page.)

OTHER PUBLICATIONS

SHO43–46800—Publication of Examined Utility Model in the Japanese Patent Office, Feb. 1973.*

*Primary Examiner*—Greg Vidovich
(74) *Attorney, Agent, or Firm*—Marshall, Gerstein & Borun

(57) ABSTRACT

A substantially flat-shaped board type carrier (8) is placed on a carrier frame mounted on the front and/or rear of a straddle type four wheeled all-terrain vehicle. The carrier surface (8A) on which baggage is placed is provided with numerous lateral anti-slip projections (8e) that are parallel to one another and expand outward. Of the parts comprising the carrier frame, at least the front main frame and rear main frame are made of pipe and support the carrier by being fitted into the fitting grooves formed by the ribs on the bottom surface of the carrier.

19 Claims, 21 Drawing Sheets

U.S. PATENT DOCUMENTS

| | | | | |
|---|---|---|---|---|
| 4,311,261 | * | 1/1982 | Anderson et al. | 224/455 X |
| 5,251,796 | * | 10/1993 | Shelhart | 224/452 X |
| 5,308,133 | * | 5/1994 | Mangum et al. | 296/39.2 |
| 5,341,971 | * | 8/1994 | Newbold et al. | 224/452 X |
| 5,573,162 | * | 11/1996 | Spencer et al. | 224/401 |
| 5,774,948 | * | 7/1998 | Petschke et al. | 410/101 X |
| 5,931,361 | * | 8/1999 | Schwimmer | 224/453 |
| 6,016,943 | * | 1/2000 | Johnson et al. | 224/401 |
| 6,017,075 | * | 1/2000 | Emery et al. | 296/69.2 X |
| 6,022,062 | * | 2/2000 | Fleenor | 296/39.2 |
| 6,213,696 | * | 4/2001 | Austin | 410/106 |

FOREIGN PATENT DOCUMENTS

| | | | |
|---|---|---|---|
| 3-14780 | | 1/1991 | (JP) . |
| 5-58365 | | 3/1993 | (JP) . |
| 8-11760 | | 1/1996 | (JP) . |
| 9-207855 | | 8/1997 | (JP) . |
| 10-16850 | | 1/1998 | (JP) . |
| 91/04883 | * | 4/1991 | (WO) ................... 410/111 |

* cited by examiner

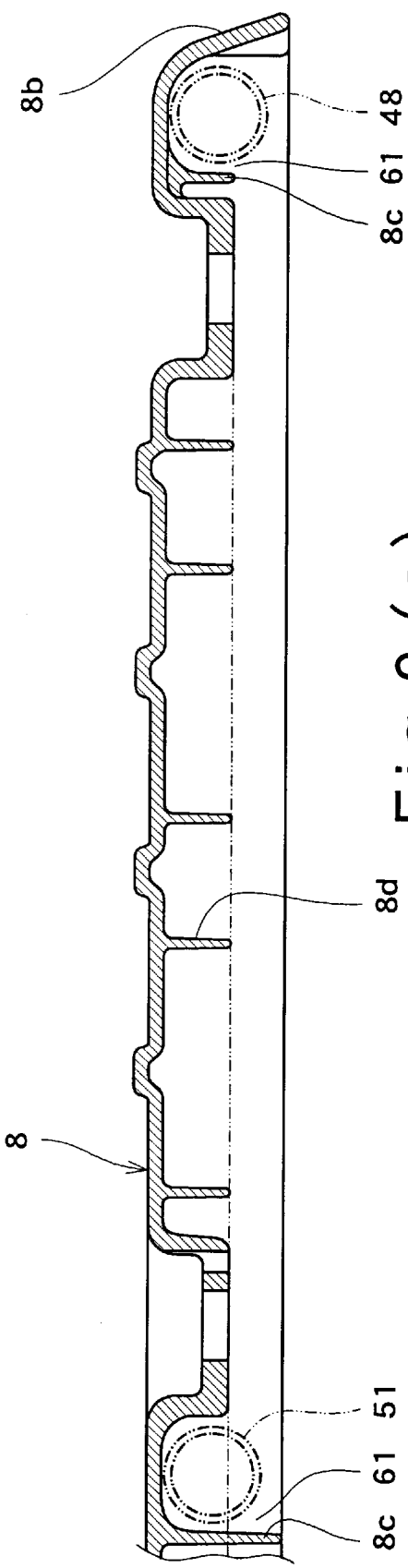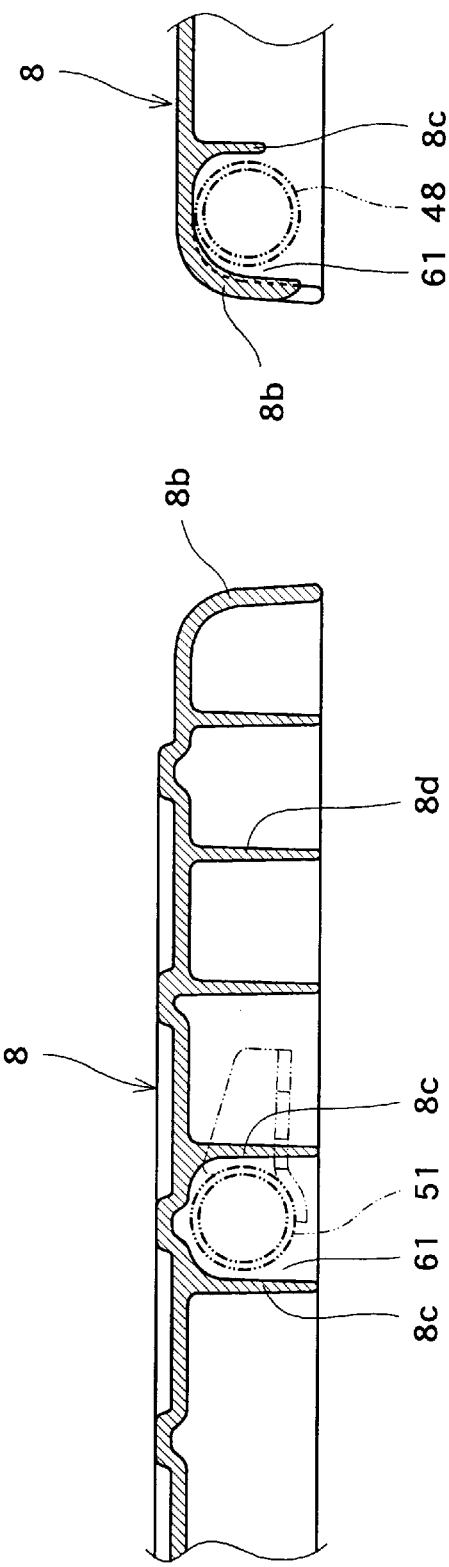

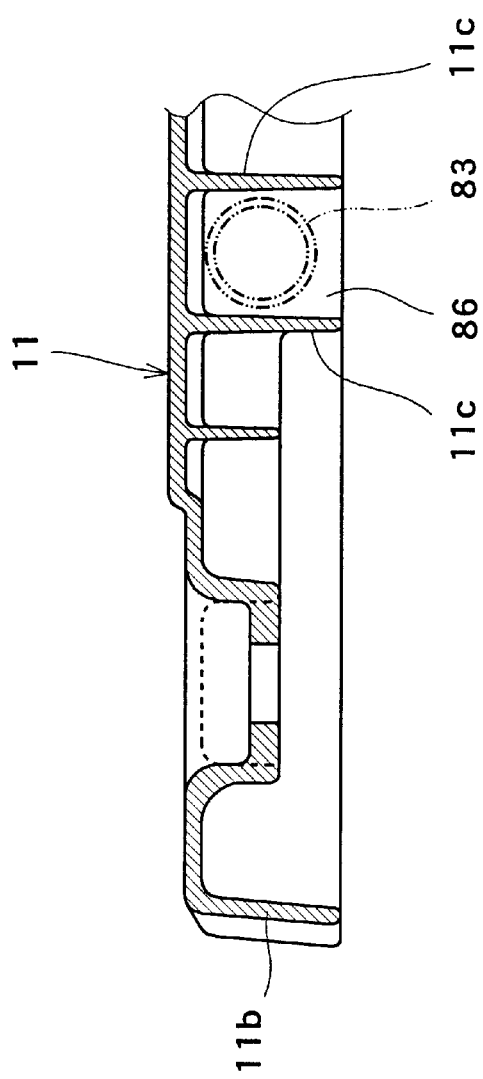
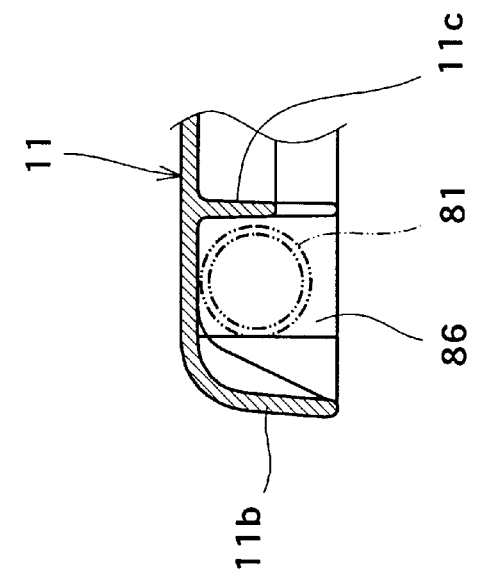
Fig.14(b)
Fig.14(a)

CARRIER FOR STRADDLE TYPE FOUR WHEELED ALL-TERRAIN VEHICLE AND SUPPORT STRUCTURE THEREFOR

BACKGROUND OF THE INVENTION

1. Field of the Invention

The present invention relates to a flat resin carrier, versatile and with a simple construction, that is mounted on the front and/or rear of a straddle type four wheeled all-terrain vehicle (so called A.T.V) and to the support structure for this carrier.

2. Description of the Related Art

A conventional type of carrier generally used to hold baggage on a four wheeled all-terrain vehicle is made of steel pipe formed in a grid and fastened to and supported by the vehicle frame [Japanese Laid-Open Patent Publication No. H9-207855, etc.].

There are also known to be carriers, for example, in which a resin fender and carrier are of an integrated construction in order to reduce the number of parts and make the carrier more lightweight, [Japanese Laid-Open Patent Publication No. H5-58365]; in which a flat board is placed on a carrier to make it easier to load baggage (U.S. Design Patent No. 378,080); and in which a container is mounted on a rear frame at the vehicle rear to improve the convenience of baggage transport [Japanese Laid-Open Patent Publication No. H3-14780].

The construction such as that in Japanese Laid-Open Patent Publication No. H9-207855, in which steel pipe is used to form a grid, is the simplest configuration for a carrier. However, it limits the size, type, shape and other properties of the baggage that can be accommodated, and in some ways it is inconvenient for loading and transporting baggage. In many cases a separate container, platform or other means is required.

When the carrier and fender are integrated as in Japanese Laid-Open Patent Publication No. H5-58365, the weight and number of parts are both reduced, but carrier functions and attributes such as size are limited by the shape of the fender.

When a container is mounted on the rear frame, as in Japanese Laid-Open Patent Publication No.H3-14780, the configuration is excellent for loading and transporting luggage, but the structure is complex and the cost is high.

When the carrier is a flat board, as in U.S. Design Patent No. 378,080, the configuration is simple and baggage can be loaded easily. However, making the carrier merely a flat surface diminishes its versatility in terms of fastening baggage and attaching containers to accommodate small items. Moreover, if the flat carrier is of resin to make it lighter and easier to manufacture, problems remain such as how to ensure the rigidity and strength of the carrier, how to ensure that the carrier remains attached to the vehicle, and how to hold the baggage on the carrier.

SUMMARY OF THE INVENTION

The primary object of the present invention is to provide a carrier for a straddle type four wheeled all-terrain vehicle, which has a simple configuration, which is versatile and easy to use, and on which baggage can be loaded easily.

A related object of the present invention is to provide a support structure, for a carrier for a straddle type four wheeled all-terrain vehicle, that can ensure the rigidity and strength of the flat board carrier which is made of resin and is made wide in order to better accommodate baggage, can ensure that the carrier can be attached easily and reliably, and can provide a means of securing baggage on the carrier.

The object of the invention described above can be accomplished by a carrier for a straddle type four wheeled all-terrain vehicle according to the present invention:

Firstly, a carrier is of flat plate-like shape and mounted on a carrier frame on the front and/or rear of a straddle type four wheeled all-terrain vehicle. A surface of the carrier, on which a baggage is placed, has numerous outward projections to prevent the baggage from slipping. This carrier of substantially flat-shaped board with anti-slip projections on its surface is easy to use, is easy to load baggage, and has a wide variety of applications. Making the projections lateral stripe-like projections (beads) that are parallel to one another increases the rigidity of the carrier and improves the overall design of the carrier. Forming notches (grains) on the surface of the projections improves their ability to prevent the baggage from slipping. Making some of the projections in the form of letters rather than stripe-like lines has the same effect.

Secondly, a carrier is a substantially flat-shaped board and mounted on a carrier frame on the front and/or rear of the a straddle type four wheeled all-terrain vehicle, and in the front and rear portions of the carrier, hooking fixtures are fitted on the carrier frame. Using hooking fixtures makes it easy to fasten the baggage even if the carrier is a substantially flat-shaped board. Making the hooking fixtures U-shaped makes it easier to fasten the baggage with ropes. Additionally, since the hooking fixtures are mounted on the carrier frame of high-strength, they can withstand considerable pulling force.

Thirdly, a carrier is a substantially flat-shaped board and mounted on a carrier frame on the front and/or rear of a straddle type four wheeled all-terrain vehicle, and a carrier surface on which the baggage is placed has a ring fixture with a ring to fasten the baggage on the carrier that can be pushed down and pulled up.

This configuration enables a rope or the like to be fastened to the ring fixture on the flat carrier surface in order to fasten the baggage in place. This makes it easy to fasten relatively small items to the large carrier surface.

Forming a recess in the carrier to accommodate the ring fixture makes the ring fixture lower than the carrier surface so it will not get in the way when the baggage is placed on the carrier. Additionally, the ring fixture comprises a ring and a mounting seat, and the mounting seat has retainer ends holding the ring pivotally that are laterally eccentric with respect to one another, and the fitting ends of the ring are fitted into these retainer ends. When the ring is accommodated in the recess in the lowered position, it is highly resistant to turning motion, making it less likely to flap around or pop up and preventing banging noise and ring wear.

Fourthly, a flat carrier is a substantially flat-shaped board and mounted on a carrier frame on the front and/or rear of the straddle type four wheeled all-terrain vehicle, and the carrier is divided laterally into three parts, a center carrier and two side carriers, and the center carrier is slidable in the direction of the vehicle front and rear. Making the center carrier able to slide allows it to project farther and enables the carrier to accommodate larger baggage.

Fifthly, a flat carrier is a substantially flat-shaped board and mounted on a carrier frame on the front and/or rear of a straddle type four wheeled all-terrain vehicle, and a storage box is mounted in the center of the carrier. This makes it easy to accommodate small items and tools even if the surface of the carrier is of flat plate-like shape.

Sixthly, a carrier is a substantially flat-shaped board and mounted on a carrier frame on the front and/or rear of the straddle type four wheeled all-terrain vehicle, and a anti-slip member made of rubber is mounted in the center portion of the surface of the carrier on which the baggage is placed. This makes it more difficult for the baggage placed on the carrier to move and makes it easier to hold small baggage in particular.

Further, a carrier support structure according to the present invention comprises a carrier frame that supports flat board resin carriers mounted on the front and/or rear of a four wheeled all-terrain vehicle. This carrier frame comprises a front main frame and a rear main frame that extend laterally respectively, and a center frame connecting the front main frame and rear main frame. At least the front main frame and rear main frame are made of pipe and are fitted into fitting grooves formed by the ribs in the underside of the carrier so the carrier is supported by the carrier frame.

The carrier ribs (a peripheral rib and joining ribs) are flexible, so even if there is a slight positional error between the carrier frame and the carrier fitting grooves when the carrier frame is fitted into the fitting grooves formed by the ribs in the underside of the carrier, the positions of the peripheral and joining ribs will be corrected when the carrier is connected to the highly rigid carrier frame, forming a single unit. Consequently, even if the width of the carrier is increased to make it better able to accommodate the baggage, this correcting function enables the carrier to be attached to the carrier frame easily and firmly. Additionally, the carrier is supported over a wide area by the highly rigid carrier frame, resulting in an excellent support structure of the flat board carrier. Furthermore, fixtures (hooking fixtures and rivets) for attaching ropes used to fasten the baggage in place can be provided easily at any location on the pipes making up the front main frame and rear main frame.

With this support structure, it is preferred that the shape of the front main frame and rear main frame follow substantially the outer perimeter of the carrier. This will effectively reinforce the perimeter of the carrier. Additionally, even if the width of the carrier is increased, the carrier frame will fit into the carrier at its perimeter, increasing the corrective function of the carrier and holding it firmly to the a carrier frame.

It is preferred that the front main frame is attached to a carrier stay rising from a front guard mounted on the front of a vehicle frame, and that a rear main frame is attached to a bracket rising from the front of the vehicle frame. This effectively supports and transmits the load on the front carrier to the front of the vehicle frame via the carrier frame.

It is preferred that the front main frame is attached to carrier stays extending upward from the sides on the rear of the vehicle frame, and that the rear main frame is attached to a end member with a substantially "U" shape rising rearward from the rear of the vehicle frame. This effectively supports and transmits the load on the rear carrier to the rear of the vehicle frame via the carrier frame.

Furthermore, if the area enclosed by the front main frame and the rear main frame is partitioned by a center frame and side frames, thereby subdividing the support area, the rigidity and supporting strength of the flat carrier will be increased and the carrier can be made even wider.

These objects as well as other objects, features and advantages of the present invention will become more apparent to those skilled in the art from the following description with reference to the accompanying drawings.

BRIEF DESCRIPTION OF THE DRAWINGS

FIGS. 9($a$),($b$) and ($c$) are sectional views taken along the lines A—A, B—B and C—C, respectively, in FIG. 8;

FIGS. 14($a$) and ($b$) are sectional views taken along the lines D—D and E—E, respectively, in FIG. 13;

DESCRIPTION OF THE PREFERRED EMBODIMENT

An embodiment of the present invention will be explained below, with references to the drawings included.

Figure 1:
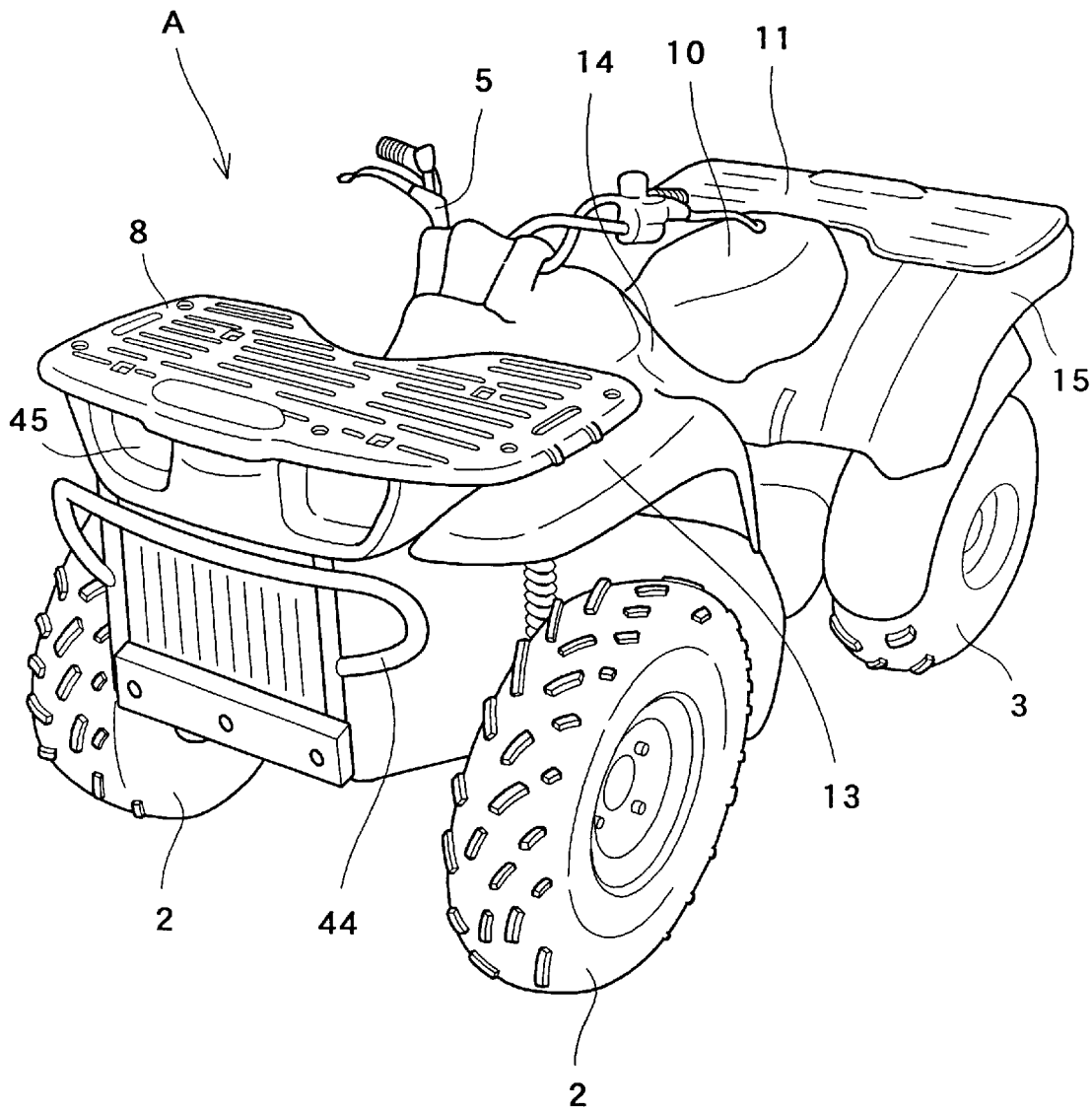
FIG. 1 is a perspective view of a straddle type four wheeled all-terrain vehicle according to an embodiment of the present invention.
Figure 2:
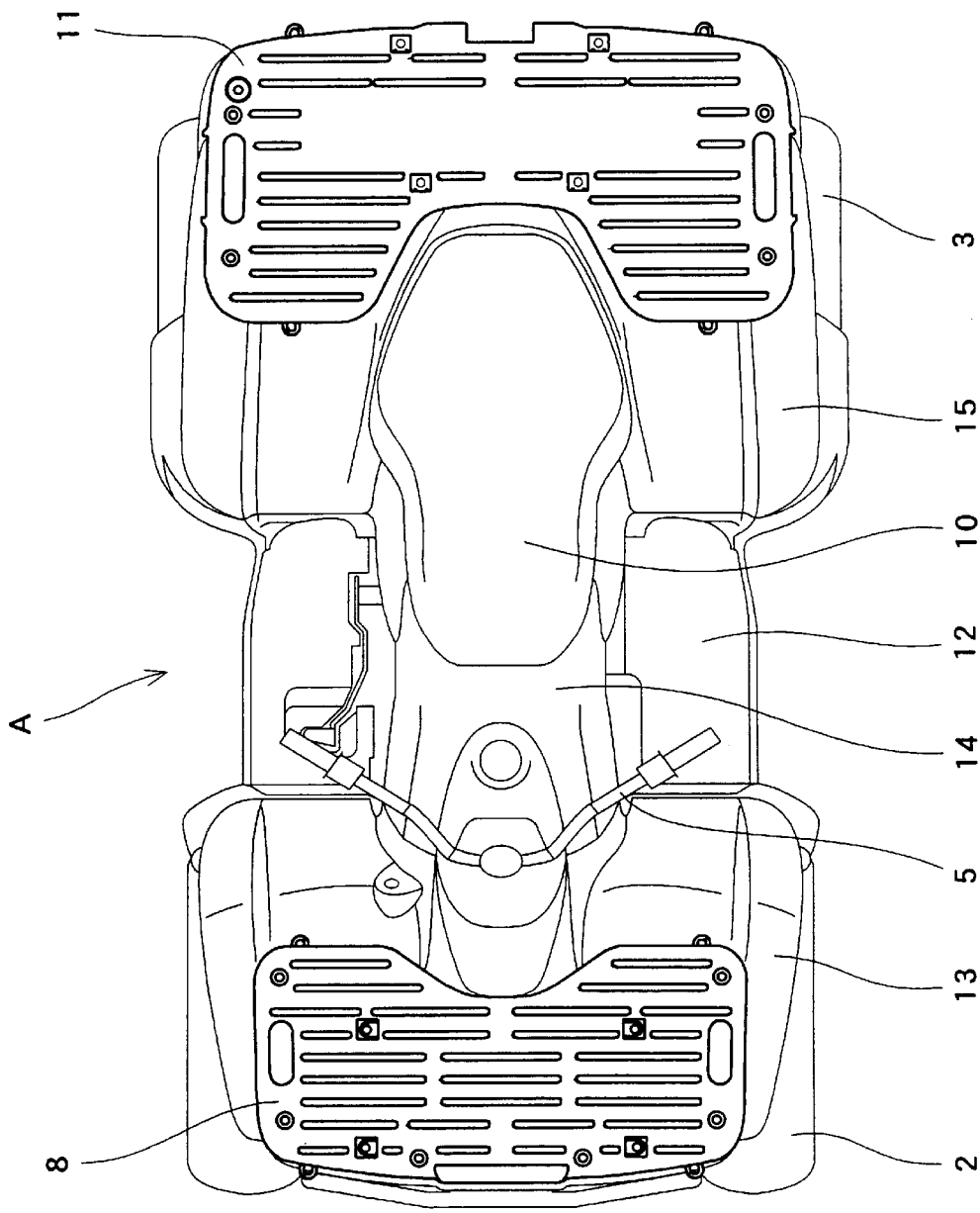
FIG. 2 is a plan view of the vehicle.
Figure 3:
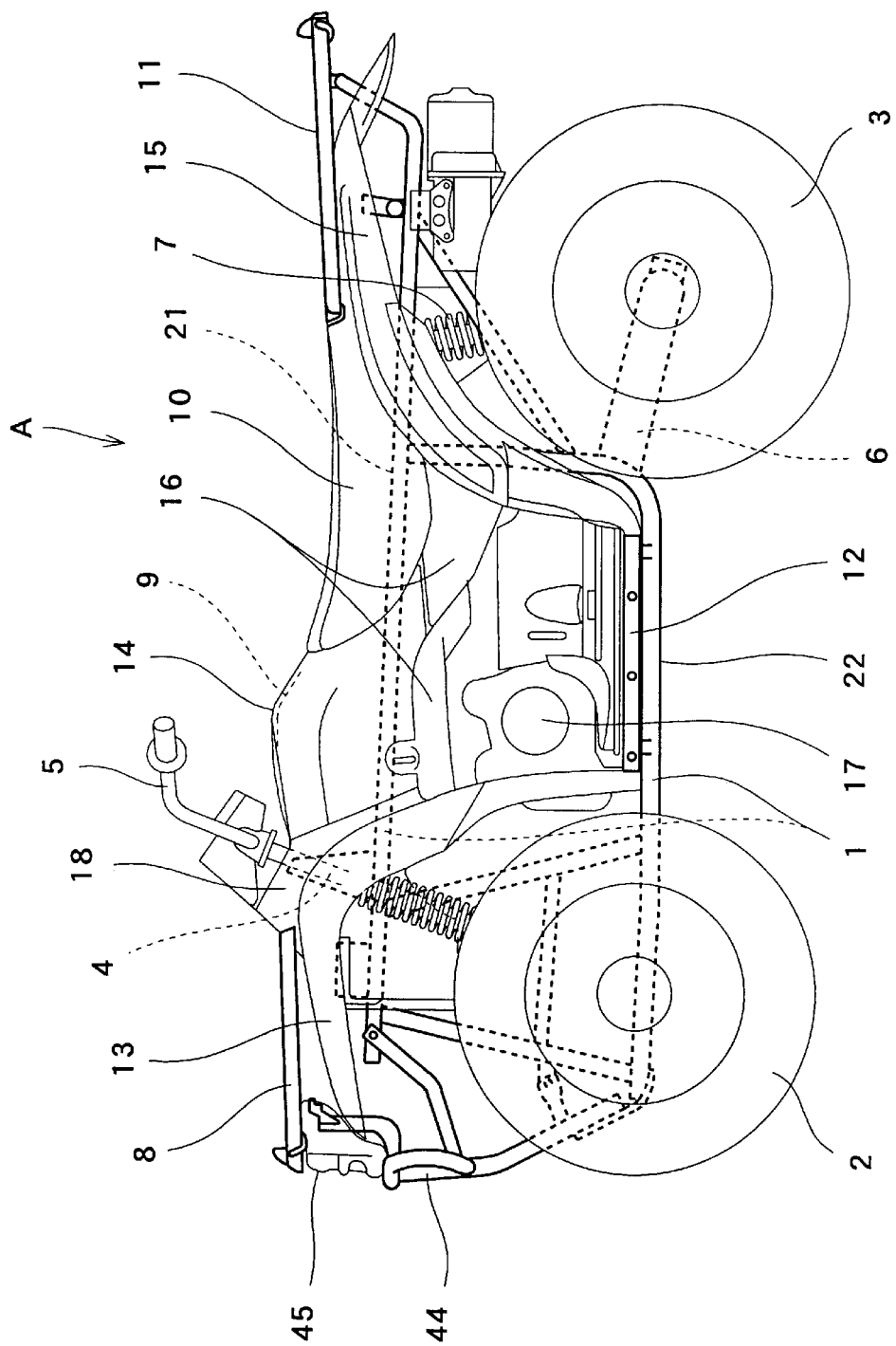
FIG. 3 is a left side view of the vehicle.
Figure 4:
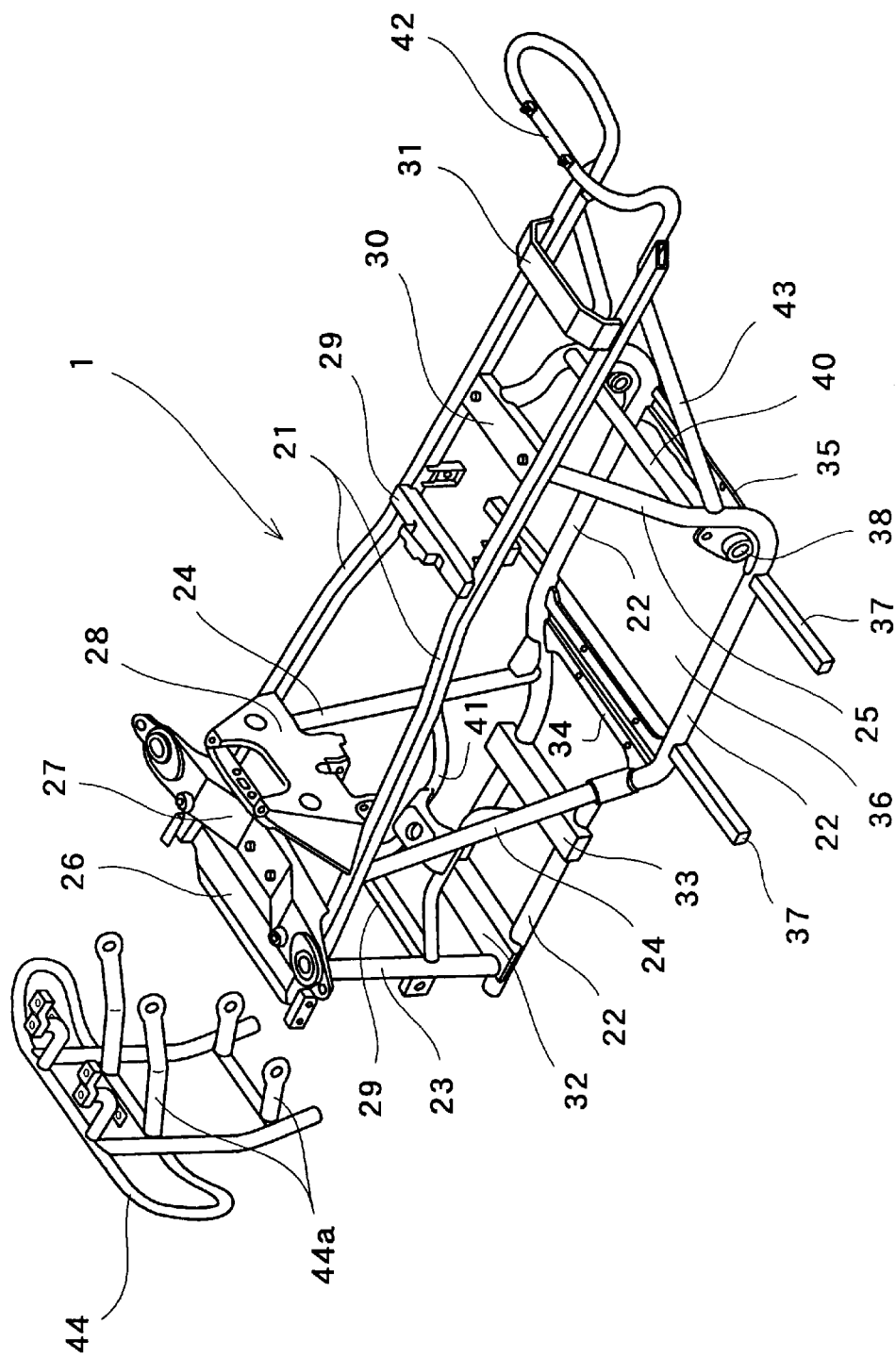
FIG. 4 is a perspective view of a vehicle frame.

FIG. 1 shows an overall perspective view of a straddle type four wheeled all-terrain vehicle to which the invention applies. FIG. 2 shows a plan view of the vehicle, while FIG. 3 shows a left view of the vehicle. FIG. 4 shows a perspective view of the vehicle frame.

In the preferred embodiment, as shown in FIGS. 1 through 3, the four wheeled all-terrain vehicle (A) has an engine (17) in the center portion of the vehicle frame (1) which is of welded pipe construction. Left and right front wheels (2), which are the steering control wheels, are disposed on both sides of the front of the vehicle frame (1), while left and right rear wheels (3) which are driven by the engine (17) are disposed on both sides of the rear of the vehicle frame (1).

A steering shaft (4) extending almost vertically is pivotally supported at the front portion of the vehicle frame (1).

Handlebar (5) is fastened to the top of this steering shaft (4) while tie rods (not shown in the drawings) leading to the left and right front wheels (2) is connected to the base of the steering shaft (4). The left and right front wheels (2) are disposed independently on both side of the front of the vehicle frame (1). The left and right rear wheels (3) are disposed on a swing arm (6) and supported by a cushion (7), and are driven by the engine (17) through a drive shaft, drive belt and other parts of a transmission mechanism (not shown in the drawings).

In order from front to rear, a front carrier (8), a fuel tank (9), a seat (10) and a rear carrier (11) are placed on the upper portion of the vehicle frame (1). A front fender (13) covering the front wheels (2) is attached at the front, and a rear fender (15) covering the rear wheels (3) is attached at the rear. Foot boards (12) that are nearly flat are mounted on both sides on the lower portion of the vehicle frame (1) between the front fender (13) and rear fender (15). Removable covers of molded plastic, etc., including a tank cover (14) and side covers (16), are mounted on the vehicle frame (1). To operate the vehicle, the driver straddles the seat (10), places his or her feet on the foot boards (12) fastened to both sides of the vehicle frame (1), and grasps the grip portions of the handlebars (5).

As shown in FIGS. 3 and 4, the vehicle frame (1) comprises left and right main upper members (21) extending longitudinally, left and right main lower members (22) extending longitudinally below the left and right main upper members (21), a plurality of side members (23) (24) (25) that connect the main upper members (21) with the main lower members (22) on the left and right, respectively at set longitudinal intervals, multiple cross members (26) (27) (28) (29) (30) (31) that connect the left and right main upper members (21) at multiple positions longitudinally, and multiple cross members (32) (33) (34) (35) that connect the left and right main lower members (22) at multiple positions longitudinally.

The vehicle frame (1) further comprises an engine guard (36) connected between the central portion of the left and right main lower members (22), two pairs of step members (37), that are fastened to the outside of the left and right main lower members (22), and left and right pivot bearings (38) for the swing arms (6) mounted at the bottom of the rearmost left and right side members (25).

The vehicle frame (1) further comprises a cross member (29) connecting the frontmost side members (23), a cross member (40) connecting the rearmost left and right side members (25), a steering support member (41) which also serves as a cross member, a rear end member (42) that connects the rear ends of the left and right main upper members (21); and left and right rear members (43) that connect the middle of the rearmost left and right side members (25) with the rearward extensions (seat rails) of the left and right main upper members (21).

At the front of the vehicle frame (1) is a front guard (44) with upper and lower mounting stays (44a) extending rearward, connected detachably to the left and right main upper members (21) and the left and right side members (23), respectively, to form a part of the vehicle frame (1). Headlamps (45) are disposed on the left and right between the front carrier (8) disposed on the upper portion of the front of the vehicle frame (1) and the front guard (44) (see FIG. 1).

Figure 5:
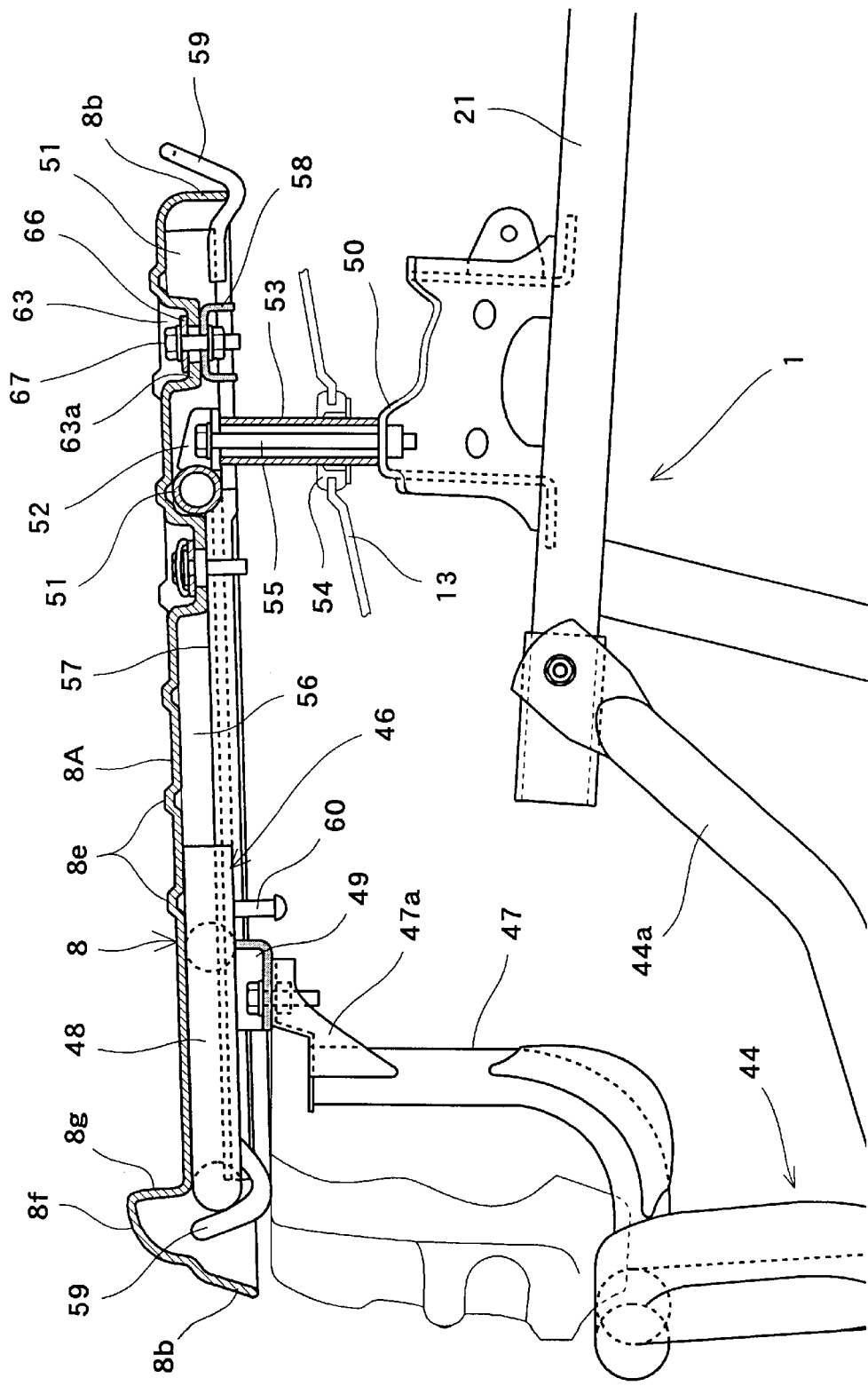
FIG. 5 is an enlarged left side view of a cross-section of an essential portion of a front carrier, showing the interface between the carrier frame and the vehicle frame.
Figure 6:
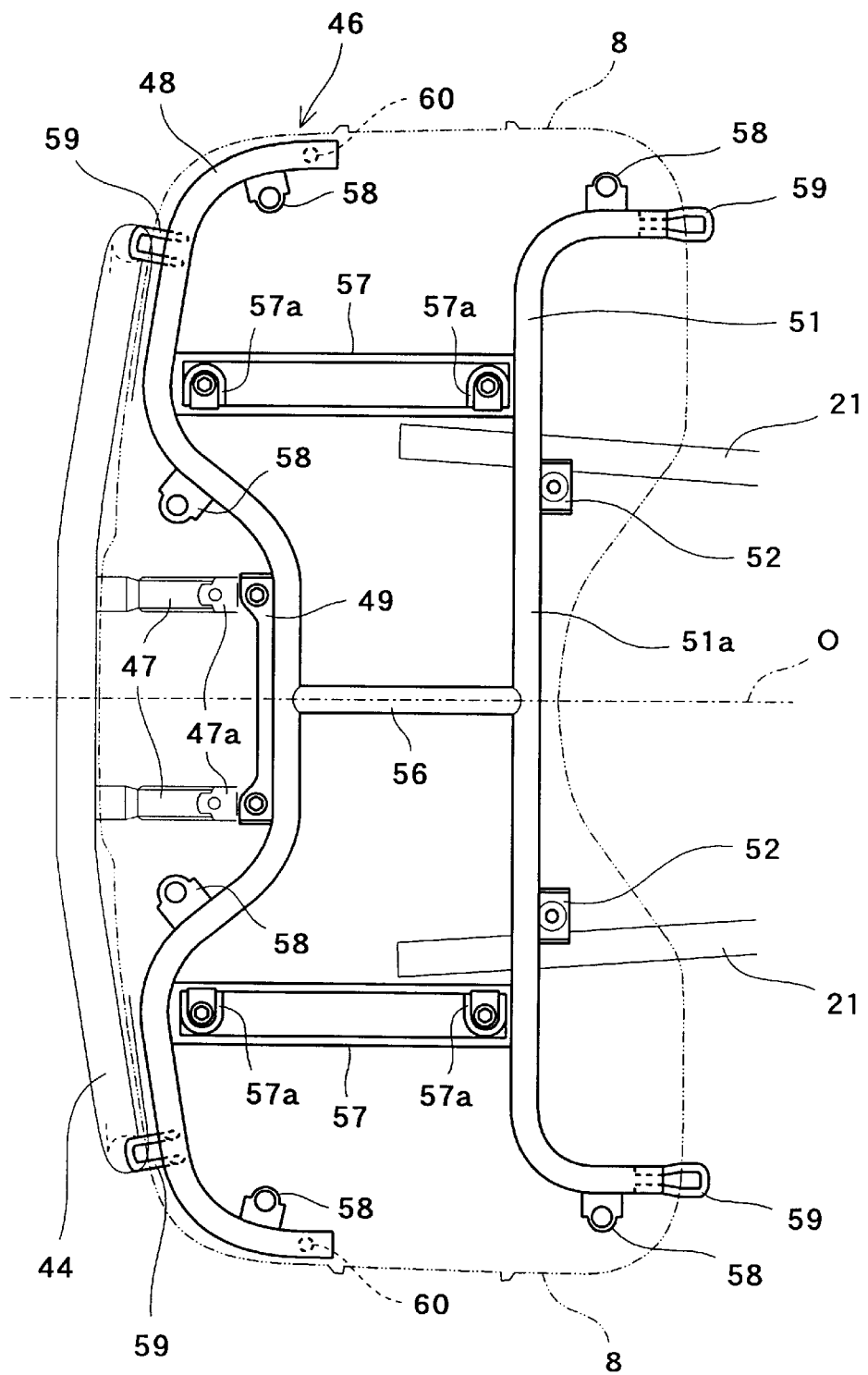
FIG. 6 is a plan view of the structure of a carrier frame including a front guard (with the front carrier itself shown by a dotted line)

FIG. 5 shows an enlarged left view of the essential portion of the interface between the vehicle frame (1) and the front carrier (8) and the carrier frame (46) which supports (in other words, that should form the framework for) the front carrier (8). FIG. 6 shows a plan view of the configuration of the carrier frame (46) which includes the front guard (44) [front carrier (8) itself is shown by a dotted line].

As shown in FIGS. 5 and 6, carrier stays (47) extend upward from the left and right of the center portion of the front guard (44), and brackets (47a) are mounted on the ends of the carrier stays (47). A long, thin flat bracket (49), which extends laterally and is fastened to the center portion of a front main frame (48) (to be described later) on the carrier frame (46), is bolted to the brackets (47a) through the vehicle center line (0).

Brackets (50) extend upward from the front of left and right main upper members (21) on the vehicle frame (1). Other brackets (52) extend rearward from a rear main frame (51) to be described later on the carrier frame (46), so they overlap the brackets (50) from upper view. Between these brackets (50) and (52), collars (53) are provided vertically so they pass through the support rings (54) on the front fender (13) Through bolts (55) passing through these collars (53) connect the brackets (52) and (50) with one another, thereby fastening the rear main frame (51) to the vehicle frame (1). Thus the front carrier frame (46) is fastened to and supported by the vehicle frame (1).

As shown in FIG. 6, the front carrier frame (46) mainly comprises the front main frame (48) and the rear main frame (51) which are made of pipe and extend laterally, the center frame (56) which is made of pipe and connects the front main frame (48) and rear main frame (51) in the center, and the channel-like side frames (57) which are mounted in parallel on the both sides of the center frame (56).

In plan view, the rear main frame (51) roughly resembles a short, wide "U" turned on its side. The long straight portion (51a) extends symmetrically in the lateral direction to near the edges of the front carrier (8) (shown as a dotted line), bending rearward in a 90-degree angle at both ends These ends extend to near the rear edge of the front carrier (8).

Respective carrier mounting brackets (58) are fastened to the left and right ends of the front main frame (48). U-shaped hooking fixtures (59) extend rearward from the rear ends of the front main frame (48). The hooking fixture (59) is made of metal wires folded over so the front end forms a loop. When viewed from the side, as shown in FIG. 5, the hooking fixture (59) roughly resembles a "V" turned on its side. The ends of the hooking fixtures (59) are welded or otherwise fastened to the bottom of the rear main frame (51). The looped (hooking) portions are separated from the rear edge of the front carrier (8), extending upward at an angle. These hooking fixtures (59) are also mounted near the left and right ends of the front main frame (48) so ropes or ropes with hooks can be attached to the hooking fixtures (59) in order to tie the baggage to the front carrier (8). With the same objective, pan-head rivets (60) extend downward below the left and right ends of the front main frame (48) (see FIG. 5).

The front main frame (48) is recessed in the center portion, forming a wave-like shape with the left and right sides symmetrical in plan view. In other words, the center portion of the front main frame (48) is recessed so it approaches the rear frame, with the center to edge portions roughly forming an "S" and the ends extending so they follow along the sides of the front carrier (8). Carrier mounting brackets (58) are mounted at four locations on the front main frame (48).

Figure 15:
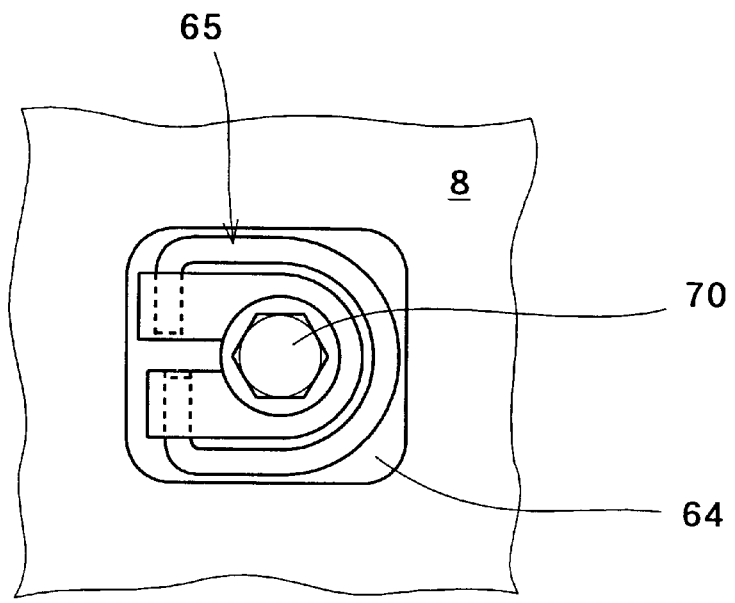
FIGS. 15($a$) and ($b$) are a plan view and section view, respectively, of a ring fixture mounted on the front carrier.
Figure 15:
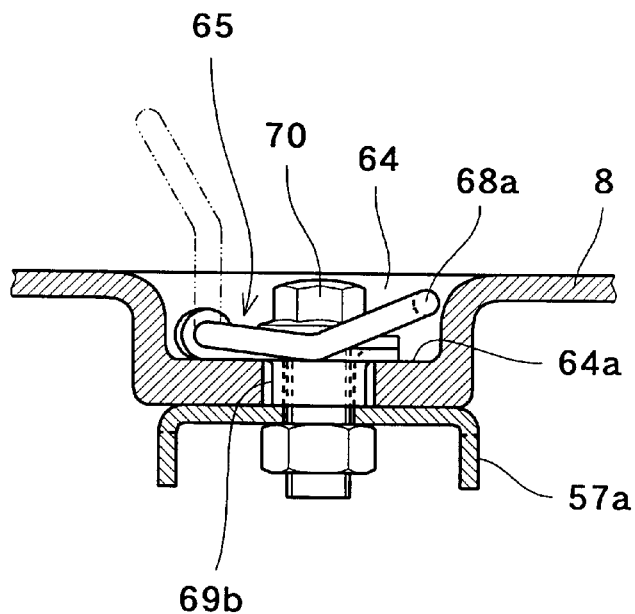

As described above, the front main frame (48) and rear main frame (51) are connected in the center by the center frame (56), and by the side frames (57) separated from the center frame (56) at a set interval and disposed at the points where the distance between the front main frame (48) and rear main frame (51) widens. The upper surface of these side frames (57) is formed by the webbed portion of a channel member, while to reduce weight the center portion is cut into a long narrow rectangle, with the exception of a carrier mounting sections (57a). The carrier mounting sections (57a) are provided on the front and rear ends of each side frame (57), and the front carrier (8) and ring fixtures (65) (see FIG. 15) are fastened together at these carrier mounting sections (57a), as will be described later.

The front carrier (8) is placed on top of the carrier frame (46) so it accommodates the pipes of the front main frame (48), rear main frame (51) and center frame (56), with the result that the entire front carrier (8) is supported by the carrier frame (46).

Figure 7:
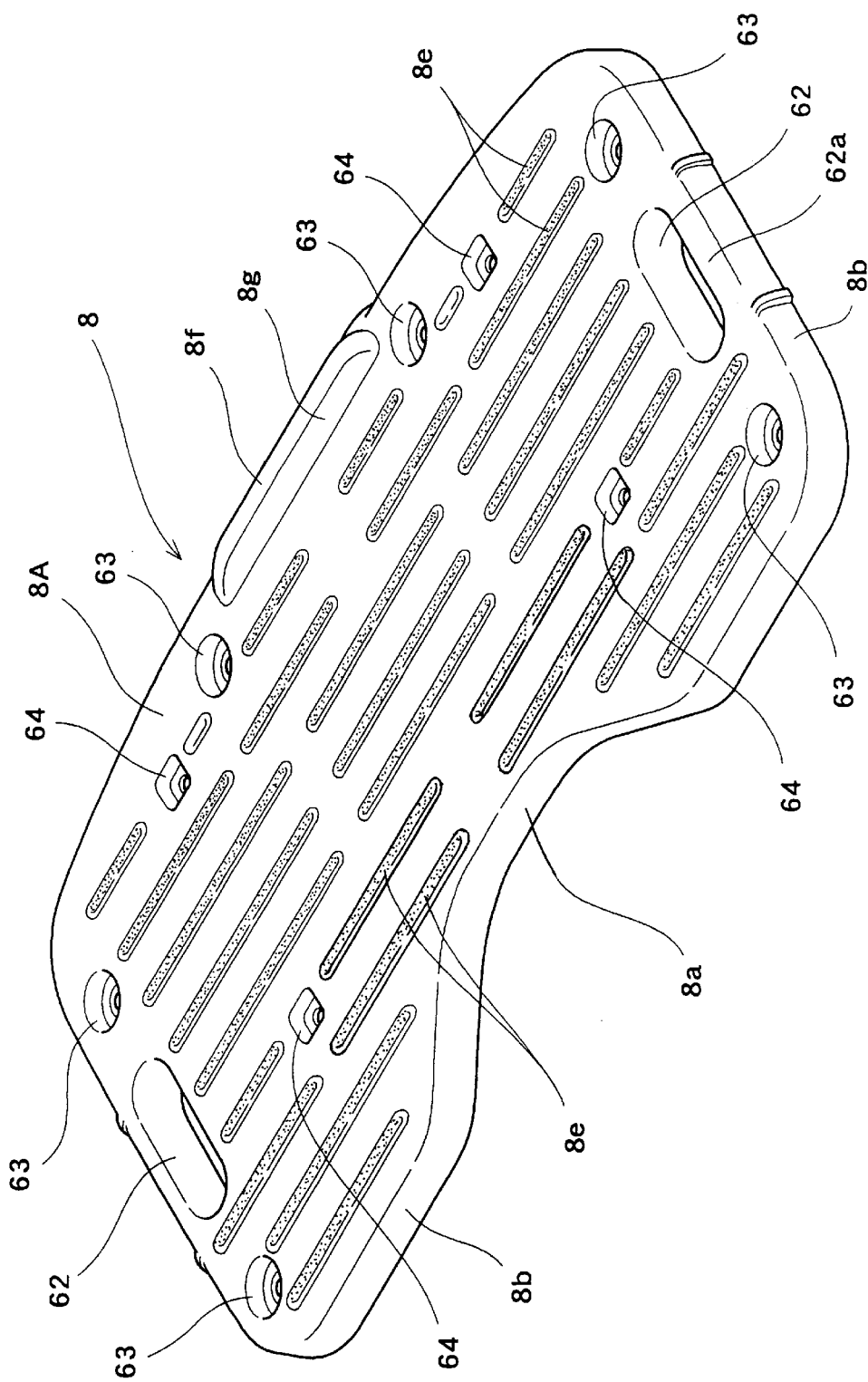
FIG. 7 is an enlarged perspective view of a front carrier.
Figure 8:
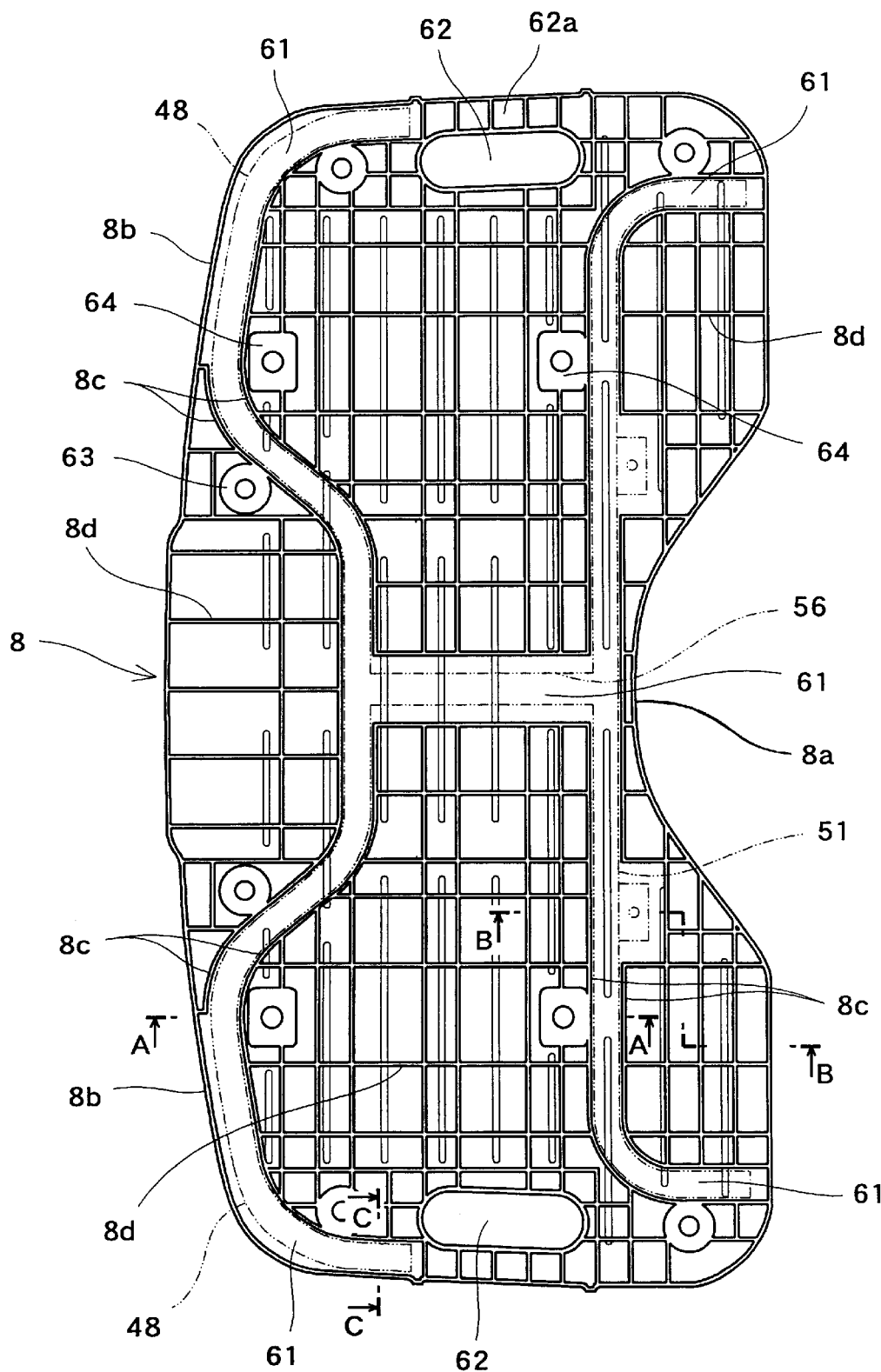
FIG. 8 is a bottom view of a front carrier.

FIG. 7 shows an enlarged perspective view of the front carrier (8). FIG. 8 shows the bottom of the front carrier (8). FIGS. 9(a) through (c) show sectional views taken along the lines A—A, B—B and C—C, respectively, in FIG. 8. The front carrier (8) is made of molded resin and, as shown in FIGS. 7 and 8, it is a substantially flat-shaped board, with a center rear edge (8a) recessed in a curve to accommodate the front head (18) (see FIG. 3) that is integrated with the front fender (13). As also shown in FIG. 5 and FIG. 9, a edge of the front carrier (8) curve downward, forming the peripheral rib (8b). Joining ribs (8c) which also provide reinforcement protrude from the bottom to form fitting grooves (61) that accommodate the pipes of the front main frame (48), rear main frame (51) and center frame (56). Reinforcing ribs (8d) running vertically and horizontally in a grid are disposed between the joining ribs (8c) and between a peripheral rib (8b) and the joining ribs (8c).

These ribs (8d),(8b) are extending below the upper surface of the carrier frame, resulting in ensuring enough length of ribs to obtain more rigid carrier.

The grooves (61) are formed into inverted U shape having larger clearance than a diameter of the carrier frame pipes. The grooves (61) are connected with other ribs formed under the carrier to assure the strength and rigidity of the mainly supporting part of carrier without increasing its weight.

The front carrier (8) with the aforementioned configuration is made of resin, so when the carrier frame (46) is fitted into the front carrier (8), even if there is some slight positional error between the fitting groove (61) formed in the front carrier (8) and the front and rear main frames (48) and (51) comprising the carrier frame (46), the peripheral rib (8b) and joining ribs (8c) in the front carrier (8) itself are flexible, so the positions of the peripheral rib (8b) and joining ribs (8c) will be corrected by the highly rigid carrier frame (46), integrating the front carrier (8) and carrier frame (46) to form a single unit. The result is that, when the front carrier (8) is fit in place, it will be fastened in that position. The weight of the baggage placed on the carrier will be supported over a wide area by the front main frame (48), the rear main frame (51) and the center frame (56), transferred to and supported by the vehicle frame (1) through the carrier frame (46).

A long thin stopper (8f) extending laterally protrudes upward on the center portion of the front edge of the carrier surface (8A) (hereafter also referred to as "the upper surface") of the front carrier (8) on which the baggage is placed. As shown in FIG. 5, at its rear this stopper (8f) has a stopper wall (8g) that is almost vertical, while at the front the stopper (8f) descends in an arc and connects to the peripheral rib (8b). This stopper (8f) is provided to prevent the baggage loaded on the carrier from moving forward.

There are also numerous stripe-like anti-slip projections (8e) (beads) of various lengths stretching laterally over the upper surface (8A) of the front carrier (8) in parallel to one another. Together with the members that include the aforementioned peripheral rib (8b) and other ribs(8c)(8d) that protrude downward, these projections (8e) provide the front carrier (8) with the necessary rigidity. At the same time, these numerous projections (8e) also provide the front carrier (8) with an ornamental design. Additionally, the surface of the projections (8e) can also be notched (grained as shown in FIG. 7) to enhance their ability to prevent the baggage from slipping.

There are handholes (62) in both sides of the front carrier (8) extending longitudinally, into which one'hands may be inserted. Normally the carrier grips (62a) at the handholes (62) are made thin in order to enable the front carrier (8) to be grasped easily when hand are inserted into the handholes (62). For this reason, the left and right rear ends of the front main frame (48) do not extend all the way to the rear of the carrier but stop just before the handholes (62).

As shown in FIG. 5 and FIG. 7, there are circular and rectangular recesses on the surface of the carrier to which the brackets (58) and (57a) provided on the carrier frame (46) (see FIG. 6) are attached. At the circular recesses (63), the front carrier (8) is bolted to the brackets (58). At the rectangular recesses (64), the ring fixtures (65) (see FIG. 15) and the front carrier (8) are bolted together to the brackets (57a).

As shown in FIG. 5, a flat bottom (63a) of each of the circular recesses (63) contacts the upper surface of the channel-like carrier mounting bracket (58), and the front carrier (8) is fastened in place with a bolt (67) through a washer. The depth of the circular recesses (63) is determined so the heads of the bolts (67) will not protrude past the upper surface of the front carrier (8).

FIGS. 15(a) and (b) show a plan view and mounting section view, respectively, of the ring fixture (65) accommodated by the rectangular recess (64). FIG. 16(a) and (b) are plan and side views, respectively, showing the ring fixture only. The depth of the rectangular recesses (64) is also determined so the heads of the bolts will not protrude past the surface of the carrier (8).

The ring fixture (65) comprises a ring (68) and a mounting seat (69) on which the ring (68) is mounted. The mounting seat (69) comprises a base (69a) with a collar portion (69b) in the center through which a bolt (70) can be passed, and retainer ends (71) on the left and right supporting the ring (68) so it can be rotated. A band (69c) that is bifurcated extends leftward from the base (69a) of the mounting seat (69), folding over to form the retainer ends (71) and spot-welded to the base(59) at four locations where it overlaps the base (69a). As shown in FIG. 16(a), the centers of the left and right retainer ends (71a) and (71b), respectively have an eccentricity δ of approximately 1 mm when viewed on a plane.

The ring (68) is made of metal wire that is itself rigid. When viewed on a plane, the ring (68) overall forms an oval, but the ends extend in a straight line from the arc portion (68a) and bend at a 90-degree angle to form the fitting ends (68b) and (68c). The left and right fitting ends (68b) and (68c), respectively are not connected but are bent so they are aligned with the positions of the eccentric retainer ends (71a) and (71b), respectively. In other words, the axial centers of the left and right fitting ends (68b) and (68c) are shifted laterally by the same amount as the eccentricity Δ of the retainer ends (71a) and (71b).

As shown in the side view in FIG. 16(b), the ring (68) is formed so it goes up in a straight line from the fitting ends (68b) and (68c), bending in a inverted vee shape in the middle. Consequently, when the ring (68) is down in the accommodated position (the lowered position) [FIG. 15(b)], even though the arc portion (68a) at the end of the ring (68) does not protrude past the carrier surface, it contacts the bottom of the recess (64a) at the bend so the arc portion (68a) at the end sticks up, making it easy to catch the arc portion (68a) at the end with a finger and lift it up to the use position shown by the dotted line in FIG. 15(b).

As shown in FIG. 15(b), the collar portion (69b) of the ring fixture (65) is fit loosely on a hole in the recess (64) of the carrier (8) and a bolt (70) is used to fasten the front carrier (8) and ring fixture (65) together to the carrier mounting bracket (57a) disposed below.

Figure 17:
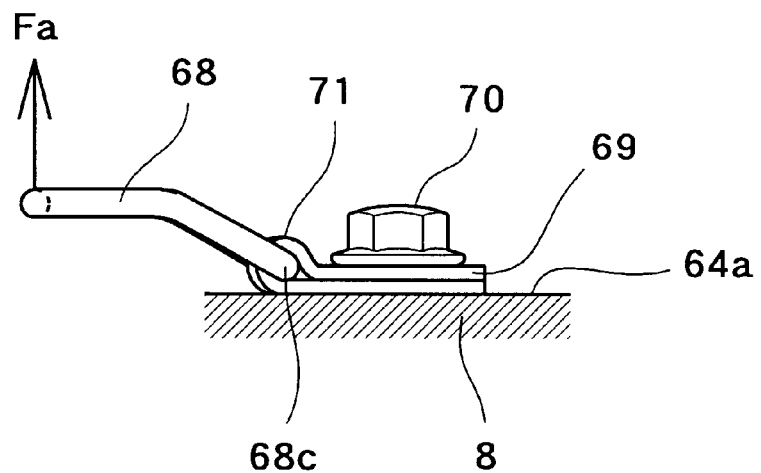
FIG. 17 ($a$) is a schematic diagram illustrating the ring in the raised mounting position and FIG. 17($b$) is a schematic diagram illustrating the ring in the lowered position.
Figure 17:
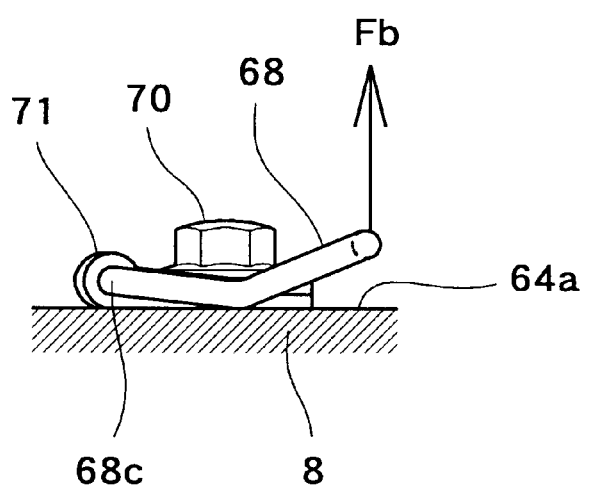

In the ring fixture (65) with the configuration described above, the ring (68) is fastened to the retainer end (71) of the mounting seat (69) when the arc portion (68a) of the ring (68) is in the horizontal position, as shown in FIG. 17(a). In this status, since the left and right fitting ends (68b) and (68c) on the ring (68) are fit into the retainer ends (71a) and (71b) which are off-center in the same direction, the ring (68) can be moved with only a slight upward force (Fa=0.1 kgf max.) to pivot the ring toward the lowered position of FIG. 17(b). On the other hand, when one attempts to lift up the ring (68) from the accommodated position (the lowered position), as shown in FIG. 17(b) or FIG. 15(b), as the right and left fitting ends (68b) and (68c) and the retainer ends (71a) and (71b) on the ring (68) are off-center in different directions, they will attempt to move toward imaginary centers of rotation, resulting in friction between the outer surface of the fitting ends (68b) and (68c) and the inner surface of the retainer ends (71a) and (71b). As this resistance prevents the ring (68) from rotating, a much greater force (Fb=1.0–1.5 kgf) is necessary than in the situation in 17(a). Accordingly, it is almost as if the ring (68) is fastened to the carrier when it is in accommodated status. As a result, even when the engine is idling or the vehicle is in motion, the ring (68) does not move up and down when it is in the accommodated position, so it does not make noise. This also reduces wear caused by oscillation.

Ring fixtures (65) are disposed at the four corners of a quadrilateral on the carrier of flat plate-like shape, so they are convenient for tying small objects on the carrier. However, as shown in FIG. 6, it is also possible to use the two rivets (60) and the four hooking fixtures (59) disposed even farther out from the ring fixtures (65) to enable large objects or baggage of various shapes to be tied to the carrier. The ease with which baggage can be tied improves the loading capability, usefulness and versatility of the flat front carrier (8).

In this preferred embodiment, ring fixtures (65) are disposed at the four corners of a quadrilateral on the flat carrier, but naturally the number can be increased or decreased or the positions can be changed etc. in accordance with use.

Figure 10:
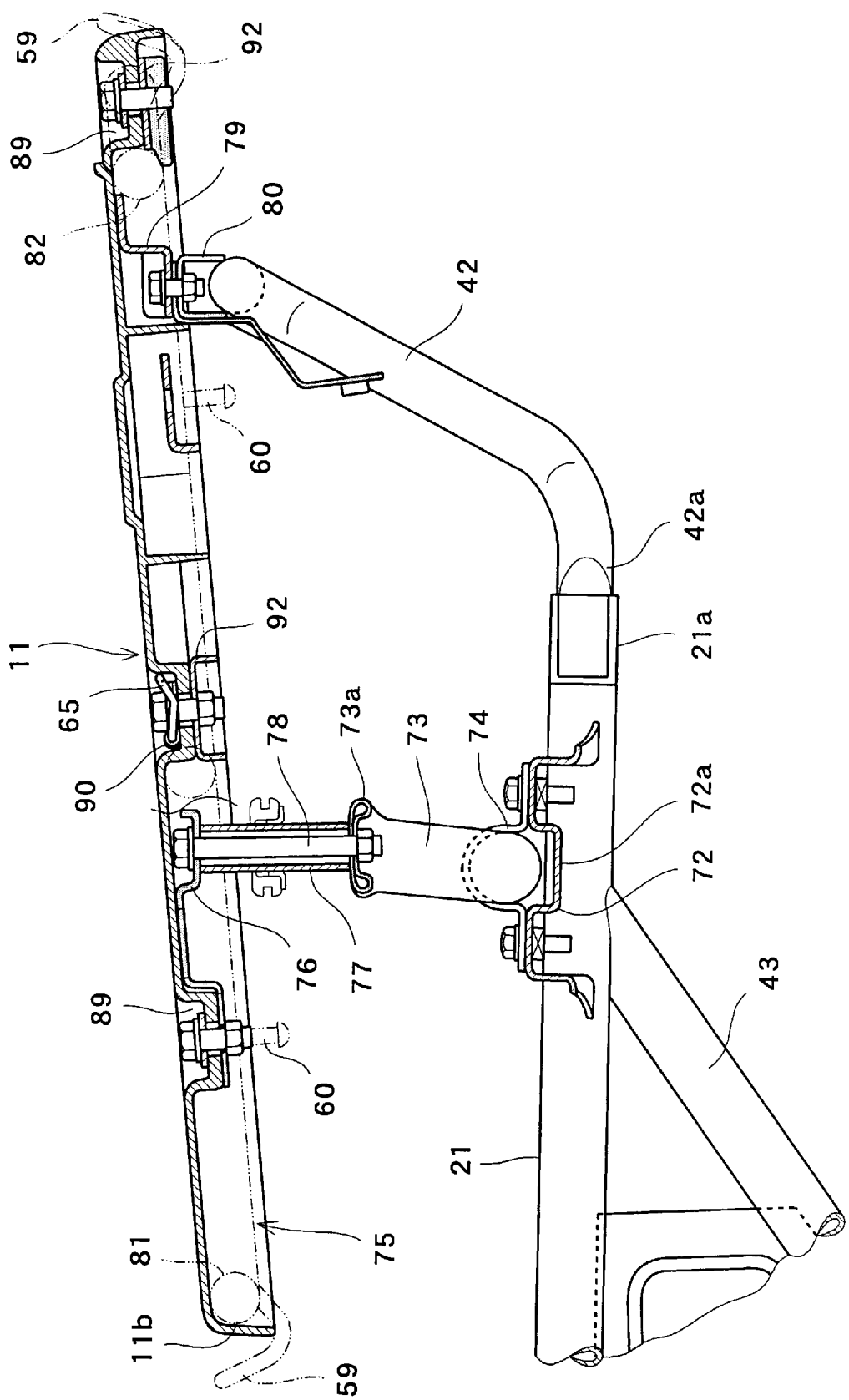
FIG. 10 is an enlarged left side view of a cross-section of an essential portion of a rear carrier, showing the mounting configuration of a carrier frame and the vehicle frame.
Figure 11:
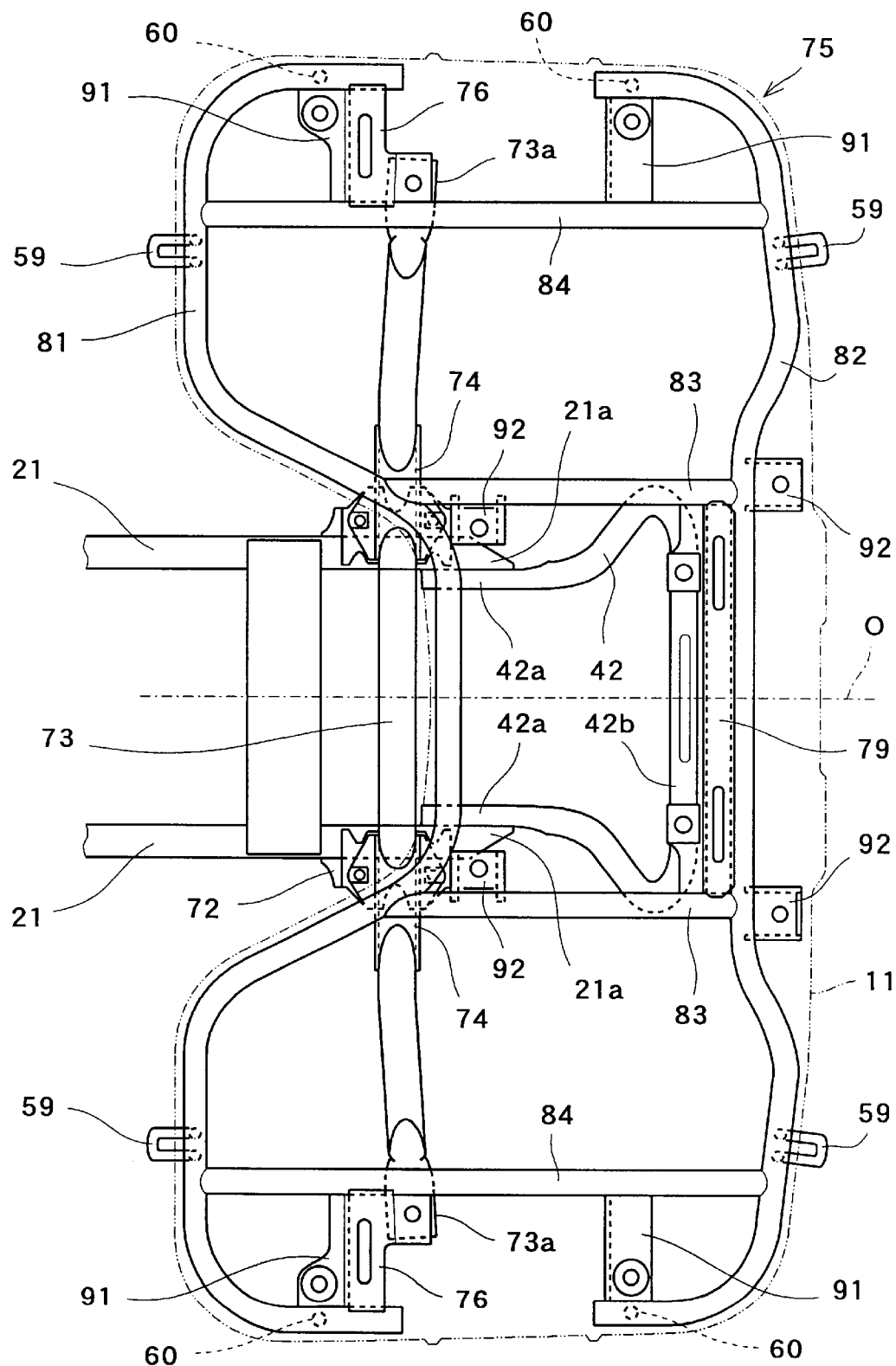
FIG. 11 is a plan view of the structure of the carrier frame (with the rear carrier itself shown by a dotted line)
Figure 12:
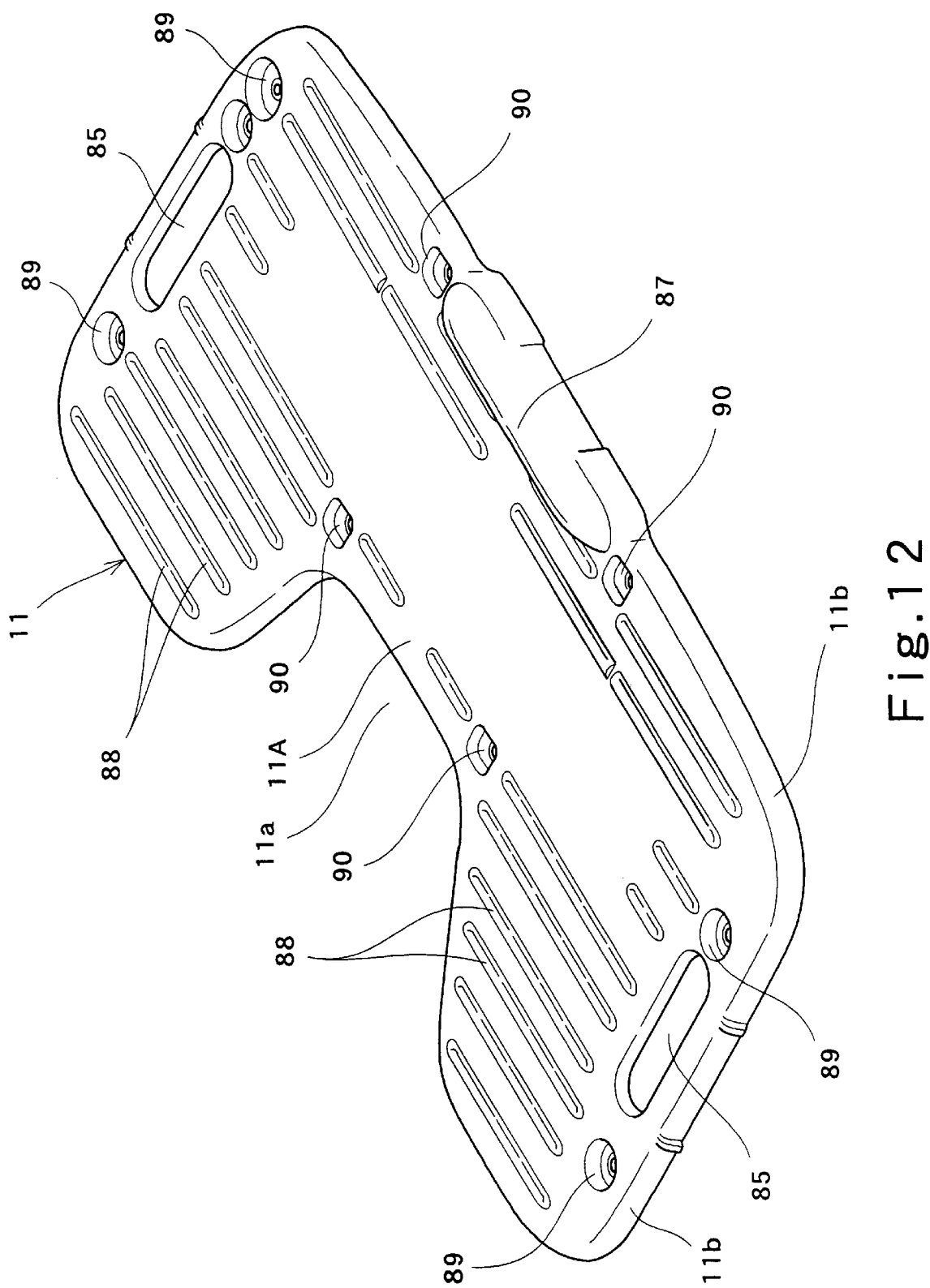
FIG. 12 is an enlarged perspective view of the rear carrier.
Figure 13:
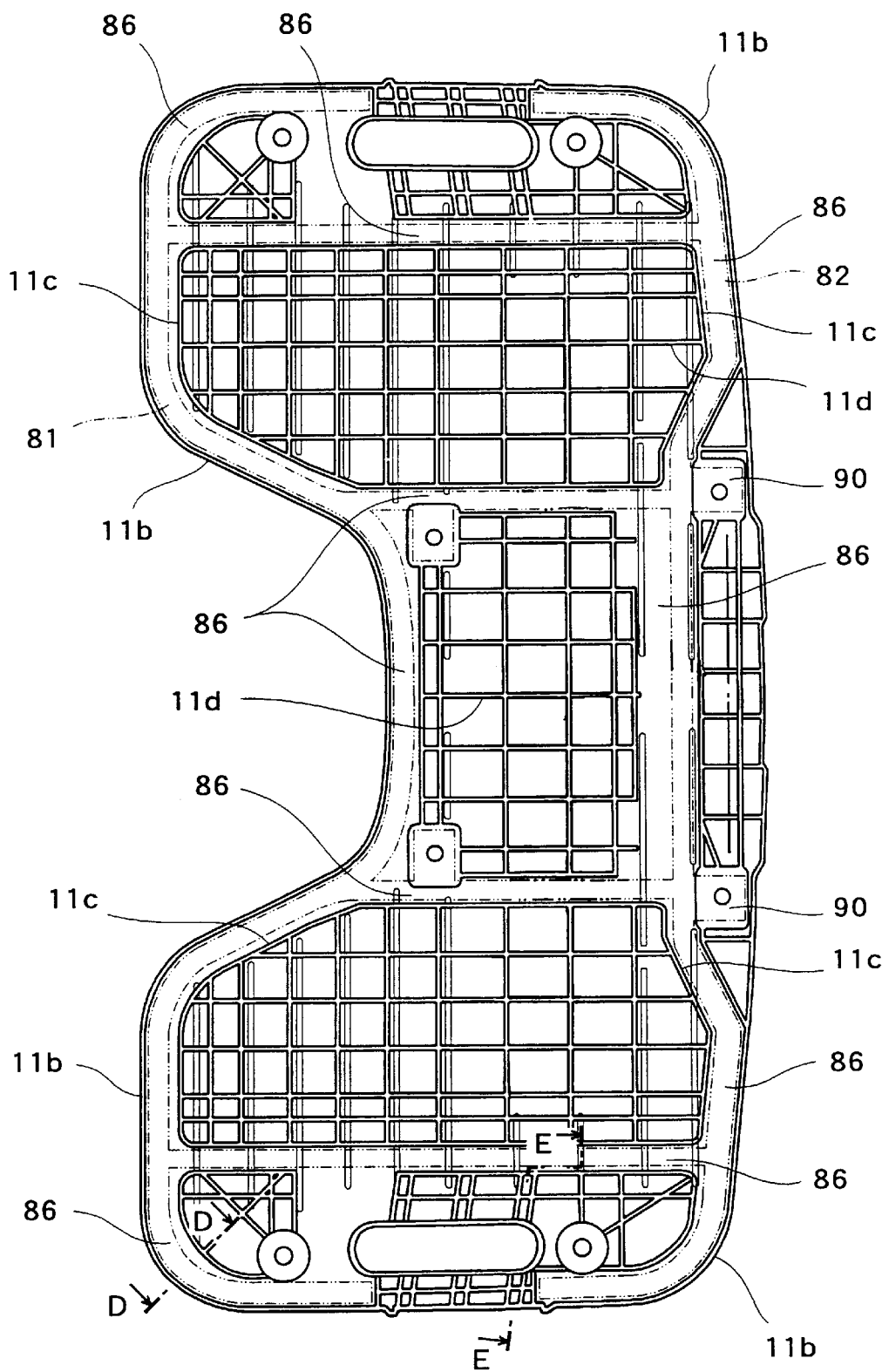
FIG. 13 is a bottom view of the rear carrier.

Next, the rear carrier (11) and the manner in which it is mounted will be explained, based on FIGS. 10 through 14. FIG. 10 shows an enlarged left side view of the cross-section of the essential portion of the interface between the vehicle frame (1) and the rear carrier (11) and a carrier frame (75) which supports (in other words, that should form the framework for) the rear carrier (11). FIG. 11 shows a plan view of the carrier frame structure (the rear carrier (11) itself is indicated by a dotted line). FIG. 12 shows an enlarged perspective view of the rear carrier (75). FIG. 13 shows a bottom view of the rear carrier (75). FIGS. 14(a) and (b) are sectional views taken along the lines D—D and E—E, respectively, in FIG. 13.

As shown in FIGS. 10 and 11, ends (21a) on the back of the main upper members (21) on vehicle frame (1) are cut at an angle. In contrast, both ends of the rear end member (42) are made with the longitudinal section pressed flat to form a connector (42a). These connectors (42a) are welded or otherwise fastened along the back flat portion of the ends (21a) of the main upper members (21). Brackets (72) with a corrugated shape are mounted slightly ahead of the ends (21a) on both left and right main upper members (21). Pipe-like rear carrier stays (73) extending laterally fit in a troughs (72a) of these brackets (72) and are bolted onto the corrugated brackets (72) with welded U-bands (74). These carrier stays (73) bend from near the joints and extend upward, with ends that are pressed flat. Long vertical collars (77) are disposed between these flat portions (73a) and cross-sectional corrugated brackets (76) that are disposed above the flat portions (73a) and fastened to the aforementioned carrier frame (75). The brackets (76) on the carrier frame (75) are fastened to the carrier stays (73) by through bolts (78) passing through the collars (77).

The rear end member (42) extends upward at an angle from locations slightly behind the connectors (42a) where the main upper members (21) are connected, curving outside on the left and right, and at the rear curving toward the vehicle center line (0) and connected to the horizontal straight section (42b). A bracket (79) with a step on the carrier frame (75) disposed along this horizontal straight section (42b) and a channel-like bracket (80) disposed on the rear end member (42) are bolted together in two locations on the left and right.

In this way, the carrier frame (75) is fastened to the vehicle frame (1) by being mounted at the front to the carrier stays (73) and at the rear to the rear end member (42).

The carrier frame (75) which supports the rear carrier (11) is formed so it is symmetrical with respect to the vehicle center line (0). It mainly comprises two main frames (81) and (82) made of pipe spaced apart longitudinally, two center frames (83) connecting these two main frames (81) and (82), and two side frames (84) on the outside of the center frames (83).

The rear main frame (82) forms a "U" shape overall with the center extending laterally in a straight line, but at the position of the center frames (83) it curves slightly rearward and extends along the perimeter of the end of rear carrier 11 (shown by a dotted line) and then curves in a 90-degree arc at both sides and extends frontward.

The front main frame (81) extends laterally in a corrugated shape, curving along the outer perimeter of the front of the rear carrier (11) from the left and right sides to the center roughly in an "S" shape, with a straight recess in the center that approaches the rear main frame (82). The front main frame (81) and rear main frame (82) are connected by two center frames (83), positioned slightly to the outer sides of the main upper members (21), and by two side frames (84) which are disposed on farther outside at the points where the front main frame (81) and rear main frame (82) are spaced far apart longitudinally. In this way, the rear carrier (11) is supported by the front main frame (81), rear main frame (82), center frames (83) and side frames (84) so it can bear the weight of the baggage loaded. In other words, the area between the front main frame (81) and the rear main frame (82) is supported in areas subdivided by the center frames (83) and side frames (84), increasing the rigidity and supporting strength of the rear carrier (11) and enabling the carrier to be made wider.

As there are handholes (85) (FIG. 12) on the sides of the rear carrier (11), the ends of the front main frame (81) and rear main frame (82) are not connected. However, they may be integrated into a continuous unit by such methods as shifting the position of the handholes (85) toward the center.

As in the case of the front carrier (8), the rear carrier (11) of substantially flat-shaped board is placed on the carrier frame (75) so the front main frame (81), rear main frame (82), center frames (83) and side frames (84), which are made of pipe, fit into the rear carrier (11), such that the rear carrier (11) is wholly supported by the carrier frame (75).

For its entire length, the front main frame (81) is mounted along the outer perimeter of the rear carrier (11), and the rear main frame (82) is also mounted almost entirely along the outer perimeter of the rear carrier (11). This is because, firstly, the outer perimeter of the rear carrier (11) is the place that is most likely to strike other objects, so the frames are disposed along this perimeter to give it special reinforcement, secondly, this construction enhances the integration of the rear carrier (11) and the carrier frame (75) by fitting the carrier frame (75) into the fitting grooves (86) on the rear carrier (11),and thirdly, even if the carrier is made wider to increase its baggage loading capability, the carrier will be securely fastened to the carrier frame (75) by supporting the carrier on its outer perimeter.

The configuration of carrier 11 itself and the technical concept relating to the bottom rib structure are essentially the same as for the front carrier (8) described earlier, and the same method is used to mount the carrier (11) on the carrier frame (75).

The rear carrier (11) is of molded resin and, as shown in FIGS. 12 and 13, forms a laterally long flat surface with a trapezoidal recess (11a) in the front center portion to accommodate the seat. As shown in FIGS. 10 and 14, the perimeter of the rear carrier (11) is curved, forming the peripheral rib (11b). Joining ribs (11c) protrude from the bottom, both for reinforcement and to form fitting grooves (86) to accommodate the front main frame (81), rear main frame (82), center frames (83) and side frames (84). Reinforcing ribs (11d) are disposed vertically and horizontally in a grid between the joining ribs (11c) themselves and between the joining ribs (11c) and the peripheral rib (11b).

Like the front carrier (8), the rear carrier (11) with the configuration described above is made of resin. Accordingly, when the carrier frame (75), of pipe construction, is fitted into the rear carrier (11), even if there is some slight positional error between the carrier frame (75) and the rear carrier (11), the peripheral rib (11b) and joining ribs (11c) in the carrier itself are flexible, so the positions of the peripheral rib (11b) and joining ribs (11c) will be corrected by the highly rigid carrier frame (75), enabling the rear carrier (11) and carrier frame (75) to be joined. As a result, when the rear carrier (11) is fitted in place, it will be fastened in that position. The weight of the baggage placed on the carrier is supported over a wide area by the front main frame (81), rear main frame (82), center frames (83) and side frames (84), and is transferred to and supported by the rear portion of the vehicle frame (1) through the carrier frame (75).

A long thin stopper (87) extending laterally protrudes upward from the center portion of the rear edge of the upper surface (11A) of the rear carrier (11) on which the baggage is placed. This stopper has the same configuration as the stopper on the front carrier that was described earlier.

As in the case of the front carrier, numerous stripe-like anti-slip projections (88) (beads) of various lengths and parallel to one another stretch laterally over widely the upper surface (11A) of the rear carrier (11). Together with the aforementioned peripheral rib (11b), joining ribs (11c) and reinforcing ribs (11d) that protrude downward, these projections (88) provide the rear carrier (11) with the necessary rigidity. The upper surface of the projections (88) can also be notched (grained) to enhance their ability to prevent the baggage from slipping. Furthermore, projections in the form of letters (88a) can also be used in place of these numerous long, thin, parallel projections (88) to prevent slipping and reinforce the rear carrier (11), this is also very effective in providing it with an ornamental design.

Figure 16:
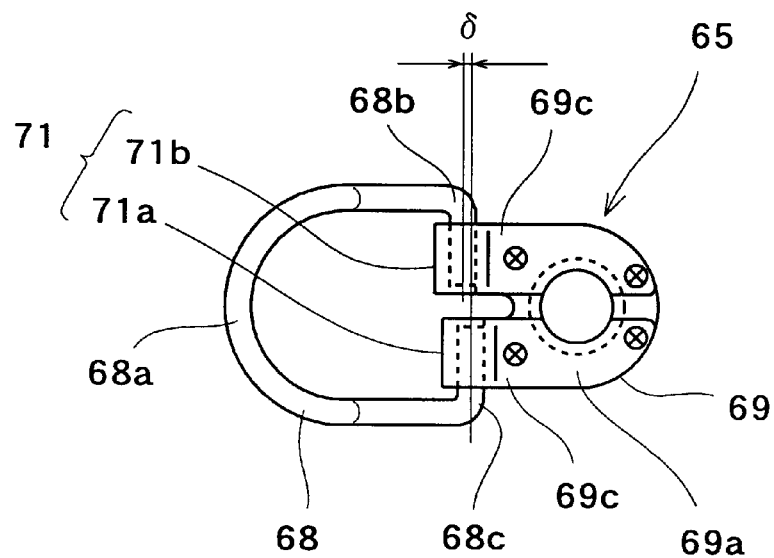
FIGS. 16($a$) and ($b$) are a plan view and side view, respectively, of the ring fixture only.
Figure 16:
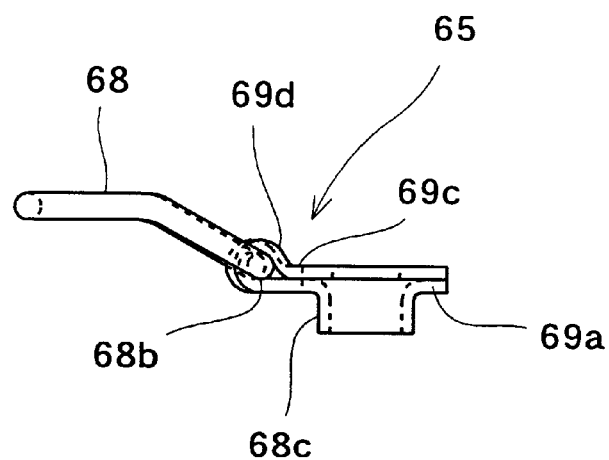

The procedure for mounting the rear carrier (11) on the carrier frame (75) is the same as for the front carrier (8). As is also shown in FIG. 10, there are circular and rectangular recesses (89) (90) at the carrier mounting sections. The circular recesses (89) are used to bolt only the rear carrier (11) to mounting brackets (91) on the carrier frame (75). The rectangular recesses (90) are used to bolt both the ring fixtures (65) and the rear carrier (11) to mounting brackets (92) on the carrier frame (75). FIG. 16 shows a detailed view of the ring fixture (65) in the rectangular recess (90), the manner in which the ring fixture(65) is attached is the same as FIGS. 15(a) and (b), so the explanation will be omitted here.

The hooking fixtures (59), rivets (60) and other binding fixtures discussed in the section on the front carrier (8) are also disposed at suitable positions on the rear carrier (11). In other words, ring fixtures (65) are disposed at the four corners of a quadrilateral (trapezoid) near the center of the flat rear carrier (11). Hooking fixtures (59) are disposed even farther out from the ring fixtures (65) on or near lines extending from the side frames (83). These hooking fixtures (59) are fastened to the front main frame (81) and rear main frame (82) so they are opposite one another longitudinally. Rivets (60) that face downward are disposed in four locations on the left and right sides of the front main frame (81) and rear main frame (82).

Providing ring fixtures and other tie fixtures in this manner enables small articles to be fastened with ropes attached to the ring fixtures (65) and large baggage to be securely tied through the use of the hooking fixtures (59) and rivets (60). The ease with which baggage can be tied improves the loading capability, usefulness and other features of the front carrier (11) of substantially flat-shaped board in the invention.

Next, three other embodiments will be described.

(1) Center sliding carrier [FIG. 18(a) and (b)]

Figure 18:
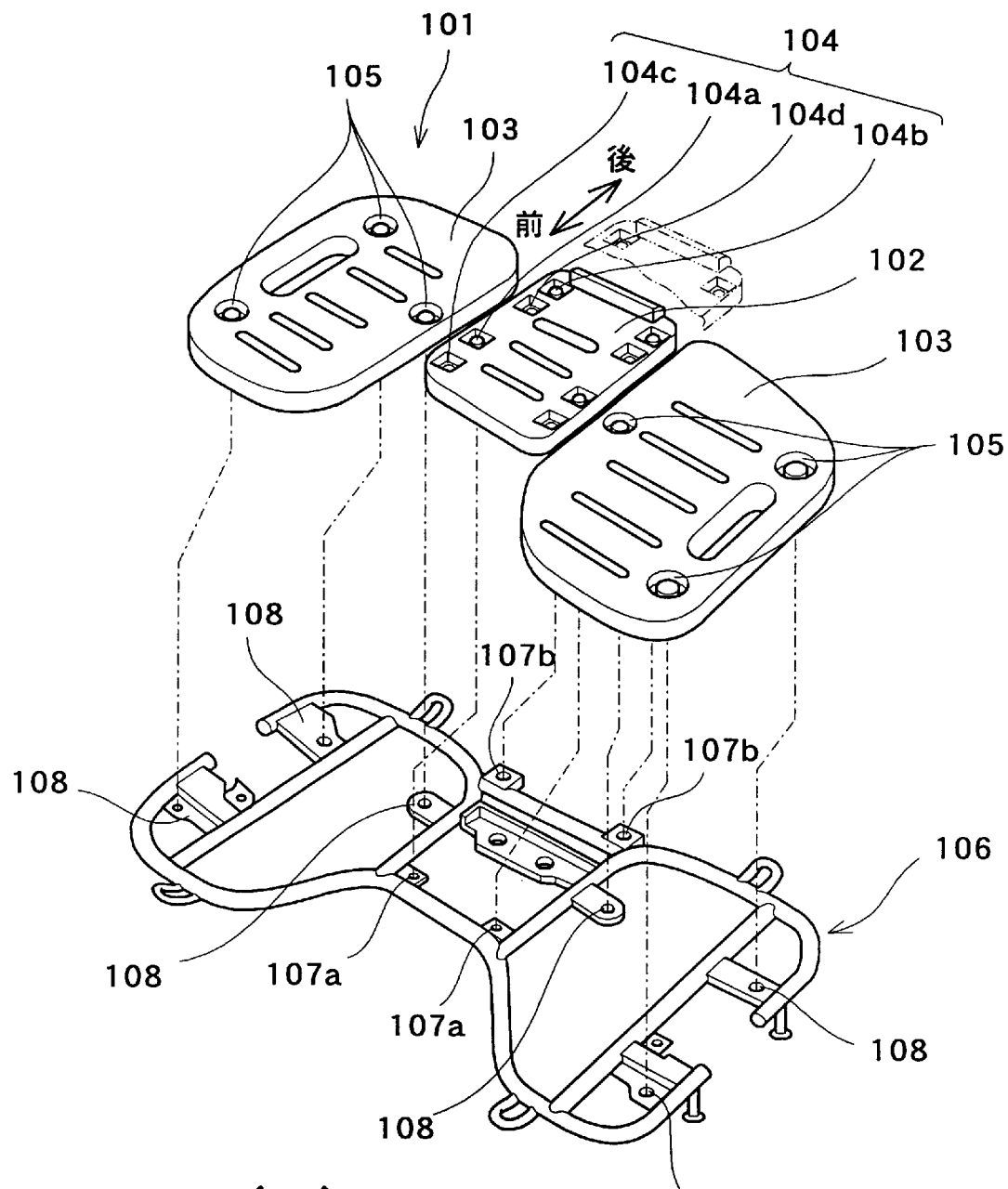
FIG. 18($a$) is a schematic perspective view of a sliding type center carrier and FIG. 18($b$) is a schematic perspective view of the carrier frame for this carrier.

The rear carrier (101) shown in FIG. 18 is divided into three parts: a center carrier (102) and left and right side carriers (103). Each of these carriers is rectangular, when assembled, they form the same general shape as the rear carrier shown in FIG. 14. The center carrier (102) and the left and right side carriers (103) are mounted on the carrier frame (106) through the same type of recesses (104) and (105) described earlier.

Two front and two rear brackets (107a) and (107b) used to mount the center carrier (106) are provided at positions on the front and back of the carrier frame (106) that are symmetrical left to right. The center carrier (102) is provided with recesses (104a) and (104b) aligned with the regular mounting position and disposed at positions symmetrical left to right, as well as separate recesses (104c) and (104d) that are shifted forward from these positions and are also symmetrical left to right. In this way, the center carrier (102) can be attached at two longitudinal positions. Consequently, moving (sliding) the center carrier (102) back, the center carrier can protrude rearward, therefore, the size of the baggage that can be loaded on the carrier is increased. This configuration can be applied to the front carrier (8) as well.

Each of the side carriers (103) is mounted to the mounting brackets (108) on the carrier frame (106) at the three recesses (105).

Figure 19:
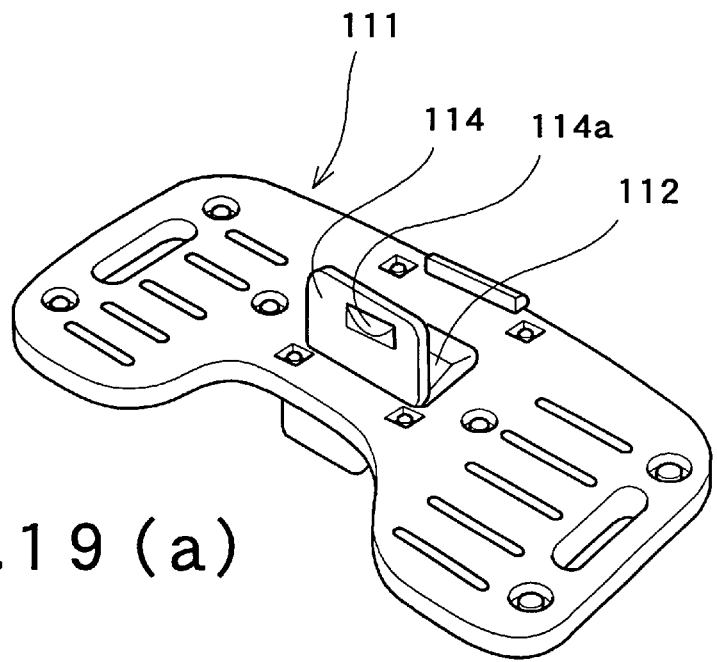
FIGS. 19($a$) and ($b$) are a schematic perspective view of a carrier equipped with a storage box and FIG. 19($c$) is a schematic perspective view of the carrier frame for this carrier.
Figure 19:
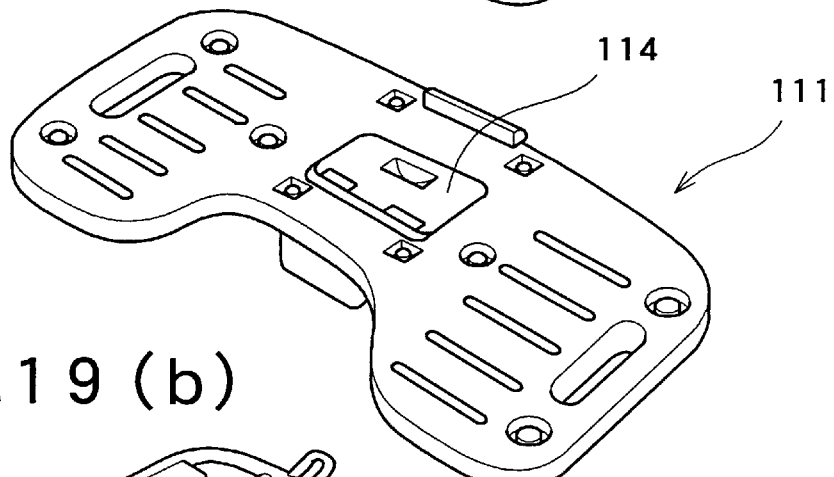
Figure 19:
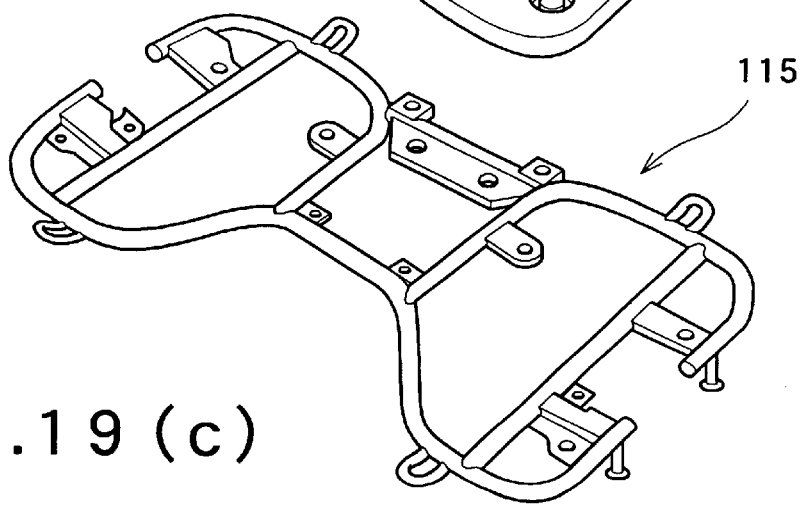
Figure 20:
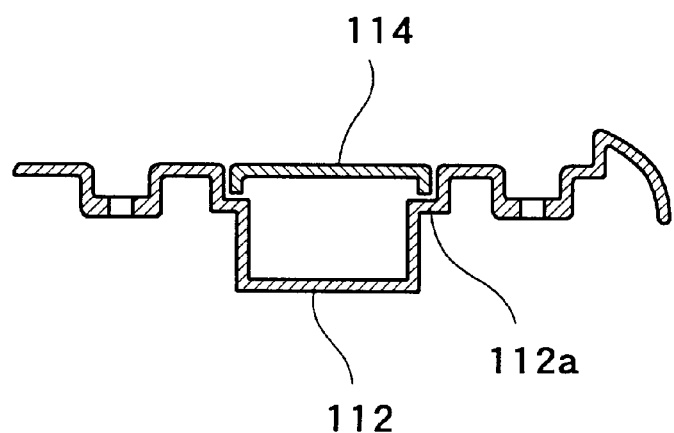
FIG. 20($a$) is a vertical section view of the central portion of the carrier equipped with a storage box and FIG. 20($b$) is a sectional view of the hinge section.
Figure 20:
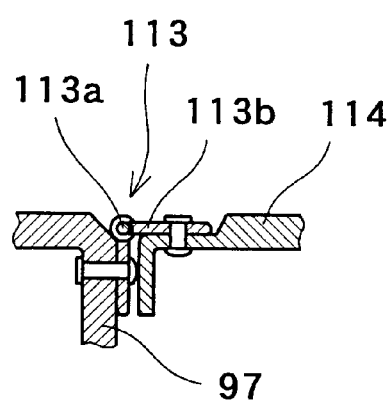

(2) Rear carrier with storage box [FIGS. 19(*a*) through (*c*) and FIGS. 20(*a*) and (*b*)]

As shown in FIGS. 19(*a*) and (*b*) and FIGS. 20(*a*) and (*b*), the center portion of the rear carrier (111) projects downward to form a rectangular storage box (112). A rectangular cover (114) that can be opened and closed by means of a hinge (113) is mounted on the stepped portion (112*a*) around the top of the storage box (112). When the cover (114) is closed, it is accommodated by the stepped portion (112*a*) so it does not protrude from the upper surface of the carrier. As shown in FIG. 20(*b*), a hinge member (113*b*) that bends at the position of the hinge pin (113*a*) is fastened to the stepped portion (112) and the cover (114). The cover (114) can be opened by inserting a finger into the hooking recess (114*a*) (see FIG. 19) on the cover (114). The storage box (112) projects downward, using the open space in the center of the rear end member (42). This storage box (112) is convenient for accommodating small objects and tools and increases the applications of the carrier. The carrier (111) is mounted on the carrier frame (115) as described earlier.

Figure 21:
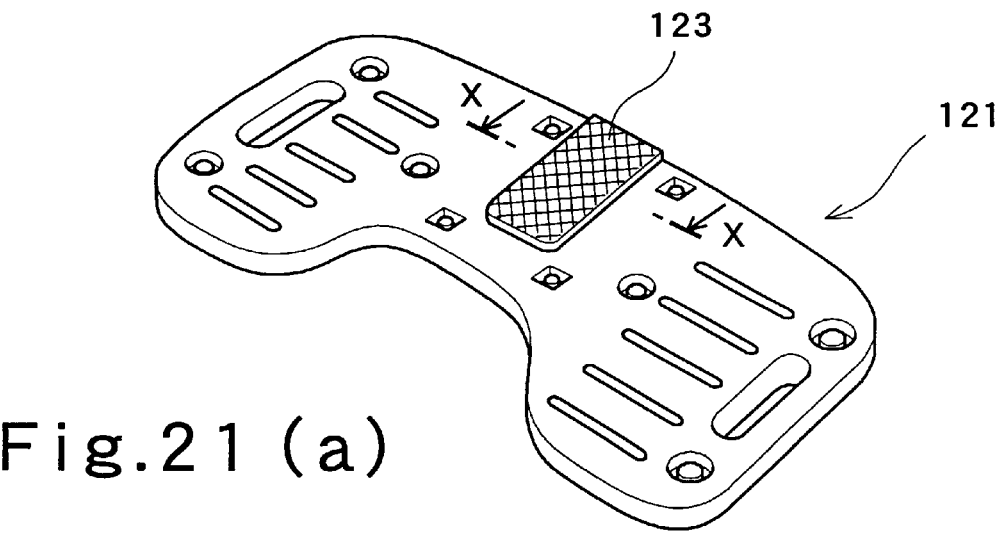
FIG. 21($a$) is a schematic perspective view of a anti-slip carrier, FIG. 21($b$) is a schematic perspective view of the carrier frame for this carrier and FIG. 21($c$) is a sectional view of this carrier taken along the line X—X in FIG. 21($a$).
Figure 21:
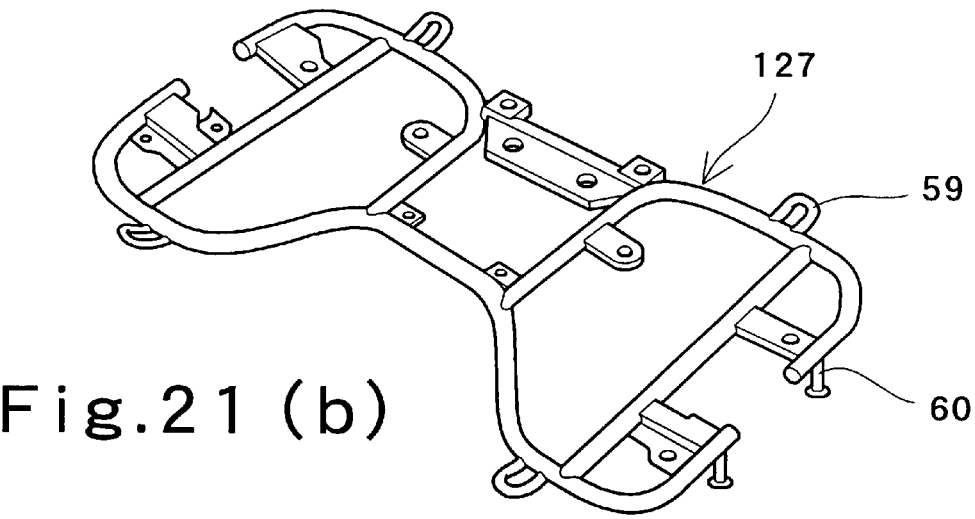
Figure 21:
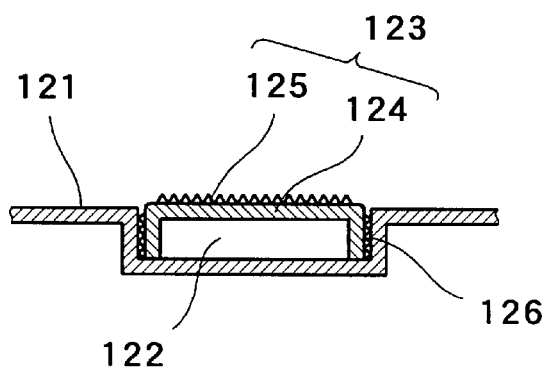

(3) Anti-slip carrier [FIGS. 21(*a*) through (*c*)]

As shown in FIGS. 21(*a*) and (*c*), a rectangular recess (122) extending from the center portion to the rear end of the carrier (121) is provided and an anti-slip member (123) is fitted into this recess (122). This anti-slip member (123) comprises a core (124) with a channel-shaped section and a piece of hard rubber (125), attached to the surface of the core (124), with numerous upwardly projecting dots. Pieces of rubber (126) are also attached to the sides of the core of the anti-slip member (123) to prevent it from moving. If baggage is placed on the carrier (121) equipped with this anti-slip member (123), the baggage will be substantially kept from moving even when the vehicle is in motion. In this preferred embodiment, the ring fixtures (65) described earlier are disposed around the anti-slip member (123), making it particularly easy to hold small articles. When ropes are used to bind the baggage onto the carrier using the hooking fixtures (59) and rivets (60) provided on the carrier frame (127), the baggage will be held in place more securely if the anti-slip member (123) is in place. The carrier (121) is mounted on the carrier frame (127) as described earlier.

Numerous modifications and alternative embodiments of the present invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A carrier for a straddle type four wheeled all-terrain vehicle comprising:
    a carrier frame;
    means for mounting the carrier frame on the vehicle;
    a substantially flat-shaped carrier board mountable on the carrier frame, and including an upper surface for carrying objects;
    securing means for securing objects on the upper surface of said carrier board, said securing means including (1) a plurality of hook extensions, each hook extension mounted to said carrier frame and extending from said carrier frame at the perimeter of the carrier board so as not to protrude from the upper surface of the carrier board for fastening objects on the carrier board; and
    said securing means further including (2) a plurality of ring fixtures, each ring fixture in a respective recess spacially separated on the carrier board so as not to protrude from the upper surface of the carrier board for fastening objects on the carrier board.

2. A carrier according to claim 1, wherein each of said ring fixtures includes a mounting seat insertably mounted in said recess and a ring member pivotally mounted to said mounting seat to pivot between a lowered position within said recess and below the carrier board surface and a raised position extending above said upper surface for securing said objects to said carrier board.

3. A carrier according to claim 2, wherein said mounting seat includes opposite retainer ends having respective offset longitudinal axes, said ring member having opposite fitting ends respectively mounted in said retainer ends resulting in friction between said ring member opposite fitting ends and said retainer ends in said lowered position of the ring member to urgingly maintain said ring member in said lowered position against undesired movement.

4. A carrier according to claim 3, wherein said ring member further includes a first portion extending from said opposite fitting ends to lie substantially flat immediately adjacent the recess bottom and a second portion extending arcuately away from said first portion and upwardly from said recess bottom in said ring member lowered position to enable said ring member second portion to be readily grasped for pivoting said ring member to said raised position above said upper surface.

5. A carrier according to claim 3, wherein said mounting seat includes a base having a lower collar portion adapted for insertable mounting into one of said respective recesses on said carrier board upper surface, said base including an upper fold-over band portion immediately adjacent said lower collar portion, said retainer ends formed intermediate and joining said lower collar portion and said upper fold-over band portion.

6. The carrier according to claim 1, wherein said carrier board is made of molded resin.

7. The carrier according to claim 1, wherein said hook extensions are provided on the front and the rear of the carrier frame.

8. The carrier according to claim 7, wherein said hook extensions are U-shaped.

9. A carrier according to claim 1, including a plurality of elongated anti-slip projections from said carrier board upper surface extending partially across said upper surface for preventing said objects from slipping when carried on said upper surface.

10. The carrier according to claim 9, wherein said anti-slip projections are lateral stripe-like projections parallel to one another.

11. The carrier according to claim 9, wherein said projections include the shape of letters.

12. The carrier according to claim 9, wherein notches are formed on the surface of the projections.

13. The carrier according to claim 1, wherein the carrier is divided laterally into three parts, a center carrier and two side carriers, and wherein the center carrier is slidable in the direction of the vehicle front and rear.

14. The carrier according to claim 1, wherein a storage box is provided in a portion of said carrier.

15. The carrier according to claim 1, wherein an anti-slip member made of rubber is mounted in a center portion of the upper surface of said carrier.

16. A carrier for a straddle type four wheeled all-terrain vehicle, wherein said carrier is a substantially flat-shaped board and is mounted on a carrier frame on the front and/or rear of the vehicle, and wherein an upper surface of the carrier board on which objects may be placed has a plurality of ring fixtures to fasten objects on said carrier board, each of said ring fixtures has a ring that can be pulled up and pushed down, and wherein said ring fixtures are accommodated in respective recesses formed in the carrier board, said ring fixtures including, a mounting seat having a base with a lower collar portion adapted for insertable mounting into one of said respective recesses on said carrier board upper surface, said base including first and second laterally spaced upper fold-over band portions immediately adjacent said lower collar portion, each said band portion terminating in a retainer end which is joined to said collar portion such that each said retainer end is laterally spaced from each other; and a ring member having opposite fitting ends respectively insertably mounted within said retainer ends pivotally mounting said ring member between a lowered position within said recess and below the carriers board uppers surface, and a raised position extending above said upper surface for mounting said objects to said carrier board.

17. The carrier according to claim 16, wherein the carrier is divided laterally into three parts, a center carrier and two side carriers, and wherein the center carrier is slidable in the direction of the vehicle front and rear.

18. The carrier accordingly to claim 16, wherein a storage box is provided in a center portion of said carrier.

19. The carrier according to claim 16, wherein an anti-slip member made of rubber is mounted in a center portion of the upper surface of said carrier.

\* \* \* \* \*